(12) United States Patent
Khavari et al.

(10) Patent No.: US 8,378,518 B2
(45) Date of Patent: Feb. 19, 2013

(54) WIND POWER GENERATOR SYSTEM, APPARATUS, AND METHODS

(75) Inventors: Abolfazl Khavari, Harrison Township, MI (US); Robert Lee Grinstead, III, Charlotte, MI (US)

(73) Assignee: Terra Telesis, Inc., Okemos, MI (US)

( * ) Notice: Subject to any disclaimer, the term of this patent is extended or adjusted under 35 U.S.C. 154(b) by 460 days.

(21) Appl. No.: 12/661,858

(22) Filed: Mar. 25, 2010

(65) Prior Publication Data
US 2010/0276940 A1  Nov. 4, 2010

Related U.S. Application Data

(60) Provisional application No. 61/211,100, filed on Mar. 26, 2009.

(51) Int. Cl.
*F03D 9/00* (2006.01)
(52) U.S. Cl. .......................................... 290/55; 290/44
(58) Field of Classification Search ................ 290/54–55
See application file for complete search history.

(56) References Cited

U.S. PATENT DOCUMENTS

| | | | |
|---|---|---|---|
| 226,357 | A | 4/1880 | Saccone |
| 2,038,467 | A | 4/1936 | Zanoski |
| 4,018,051 | A | 4/1977 | Gay |
| 4,236,866 | A | 12/1980 | Zapata |
| 4,293,274 | A | 10/1981 | Gilman |
| 4,383,801 | A | 5/1983 | Pryor |
| 4,692,095 | A | 9/1987 | Lawson-Tancred |
| 6,382,904 | B1 | 5/2002 | Orlov et al. |
| 6,465,899 | B2 | 10/2002 | Roberts |
| 6,624,542 | B1 | 9/2003 | Gabrys et al. |
| 6,688,842 | B2 | 2/2004 | Boatner |

(Continued)

FOREIGN PATENT DOCUMENTS

| | | |
|---|---|---|
| EP | 167694 A1 | 6/1984 |
| WO | WO9429590 | 12/1994 |

(Continued)

OTHER PUBLICATIONS

Comparison of variable geometry vertical axis wind turbines with horizontal axis wind turbines Shock, R.A.W. (Energy Technology Support Unit, Harwell (England).) Report: ETSU-R-47, Jan. 1990, 311 p.

(Continued)

*Primary Examiner* — Truc Nguyen
(74) *Attorney, Agent, or Firm* — Butzel Long

(57) ABSTRACT

A wind generator turbine apparatus includes a base for supporting the apparatus. A base mount is mounted on the base and a permanent magnet generator (PMG) is seated on the base mount. The PMG has an aligned shaft extending along an elongated axis defined by the shaft and is adapted to generate electricity when caused to spin circularly. The apparatus includes a wind turbine having a housing mounted over and around the shaft of the PMG about the axis. A plurality of blades is circumferentially arranged about the axis defined by the shaft of the housing between a first linkage member mounted on a first end of the housing and a second linkage member mounted on a second end of the housing. A linkage cap is mounted on the first linkage member and the first end of the housing. The shaft is caused to spin about the axis when wind force is applied to the blades to generate electricity. The apparatus can be used in airports, roadways, or rail systems to generate electricity in the presence of man made air. Systems and methods for harnessing aircraft wind energy also are disclosed.

4 Claims, 25 Drawing Sheets

U.S. PATENT DOCUMENTS

| | | | |
|---|---|---|---|
| 6,800,955 B2 * | 10/2004 | McDavid, Jr. | 290/54 |
| 7,040,859 B2 | 5/2006 | Kane | |
| 7,098,553 B2 | 8/2006 | Wiegel et al. | |
| 7,132,760 B2 | 11/2006 | Becker | |
| 7,215,037 B2 * | 5/2007 | Scalzi | 290/55 |
| 7,276,809 B2 | 10/2007 | Zambrano et al. | |
| 7,329,965 B2 | 2/2008 | Roberts et al. | |
| 7,948,110 B2 * | 5/2011 | Morgan et al. | 290/55 |
| 8,013,464 B2 * | 9/2011 | Stern et al. | 290/55 |
| 8,022,567 B2 * | 9/2011 | Davis et al. | 290/54 |
| 2003/0111844 A1 * | 6/2003 | McDavid, Jr. | 290/55 |
| 2003/0209912 A1 * | 11/2003 | Badger | 290/55 |
| 2004/0036297 A1 | 2/2004 | John | |
| 2004/0061337 A1 | 4/2004 | Becker | |
| 2005/0036887 A1 * | 2/2005 | Nadjafizadeh et al. | 415/184 |
| 2005/0169742 A1 | 8/2005 | Kane | |
| 2005/0242591 A1 | 11/2005 | Roskey | |
| 2006/0003236 A1 | 1/2006 | Mizutani et al. | |
| 2006/0152012 A1 | 7/2006 | Wiegel et al. | |
| 2007/0018464 A1 | 1/2007 | Becker | |
| 2007/0098563 A1 | 5/2007 | Rowan et al. | |
| 2007/0231118 A1 | 10/2007 | Krippene | |
| 2008/0023964 A1 | 1/2008 | Sureshan | |
| 2008/0075599 A1 | 3/2008 | Miller | |
| 2008/0131273 A1 | 6/2008 | Fuller | |
| 2008/0136191 A1 * | 6/2008 | Baarman et al. | 290/54 |
| 2008/0148733 A1 * | 6/2008 | Fein et al. | 60/641.7 |
| 2008/0273974 A1 | 11/2008 | Becker | |
| 2008/0286112 A1 | 11/2008 | Rowan et al. | |
| 2009/0110554 A1 * | 4/2009 | Dukovic et al. | 416/41 |

FOREIGN PATENT DOCUMENTS

| | | |
|---|---|---|
| WO | WO2005108779 | 11/2005 |
| WO | WO2006059062 | 6/2006 |
| WO | WO2008028675 | 3/2008 |
| WO | WO2009003537 | 1/2009 |
| WO | WO2009015907 | 2/2009 |

OTHER PUBLICATIONS

Monitoring and control system of a vertical axis wind turbine, Kuhn, Ursula (Hatfield Polytechnic) Source: Wind Engineering, v12, n4, 1988, p217-225 ISSN: 0309-524X CODEN: WIENDM.

* cited by examiner

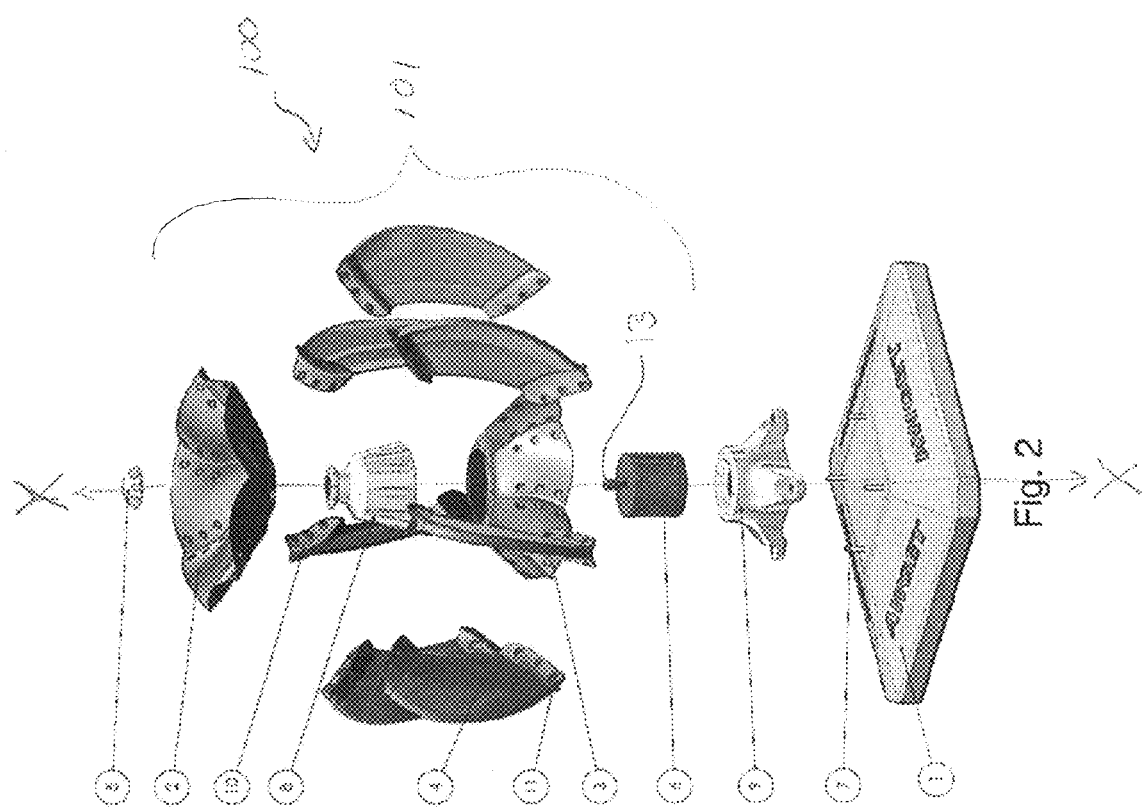

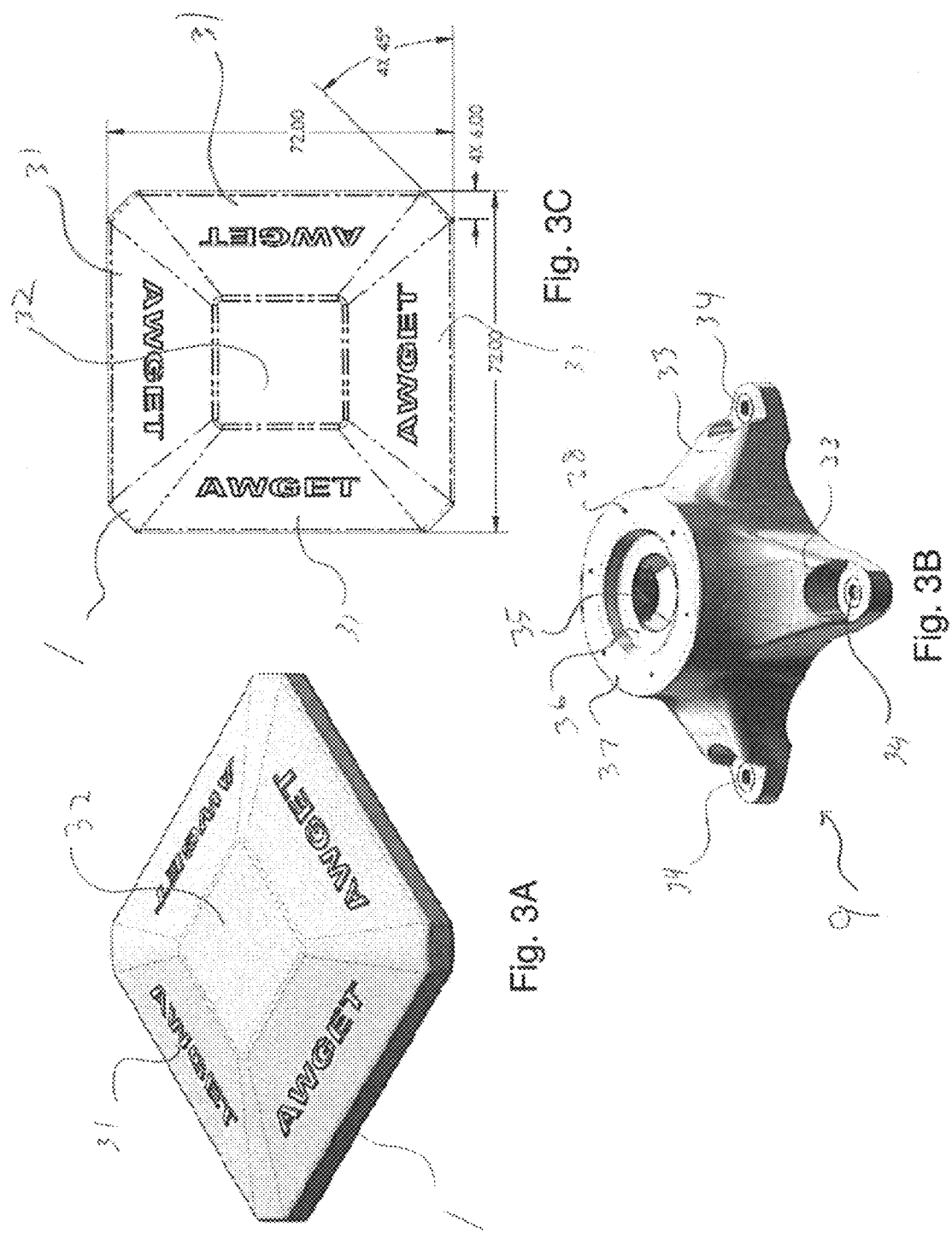

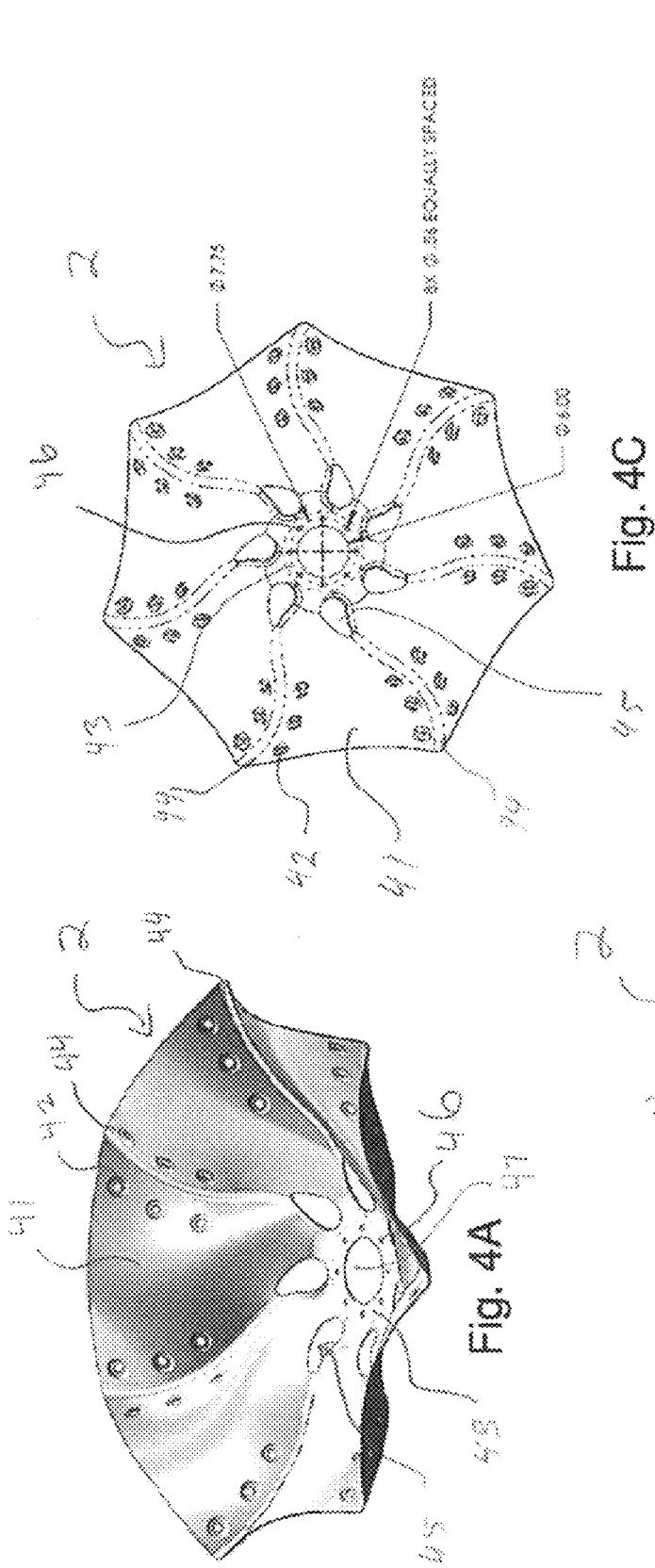
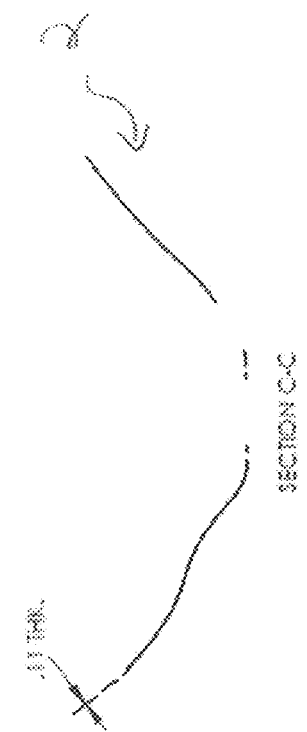
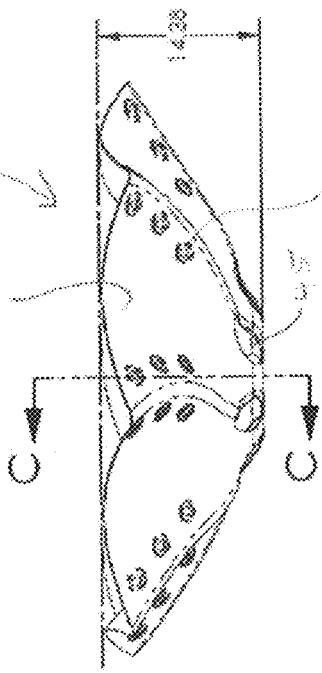
Fig. 4A  Fig. 4B  Fig. 4C  Fig. 4D

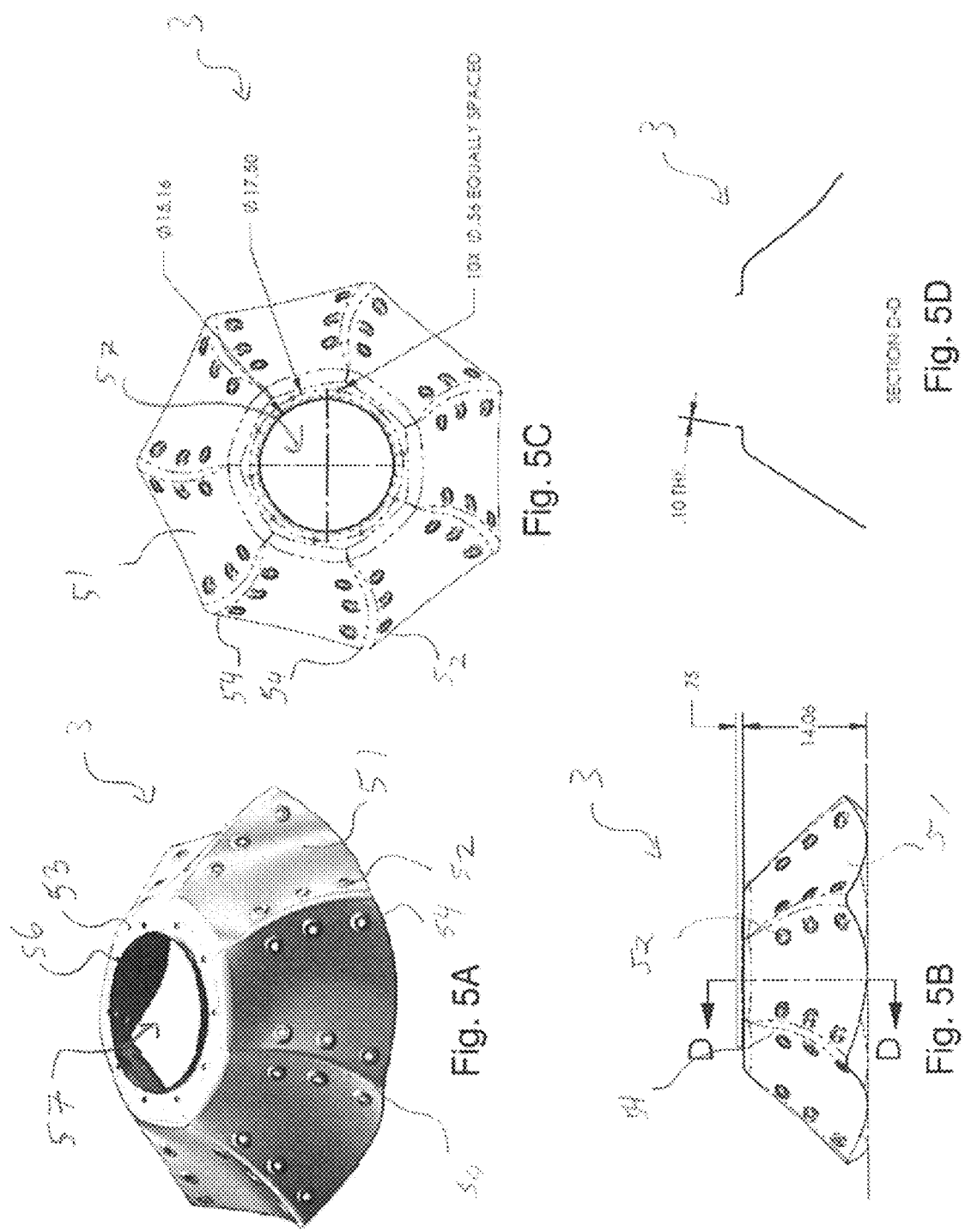

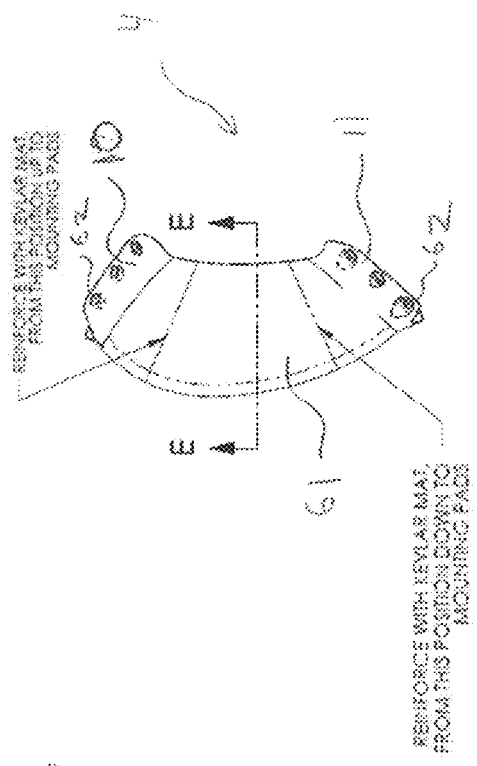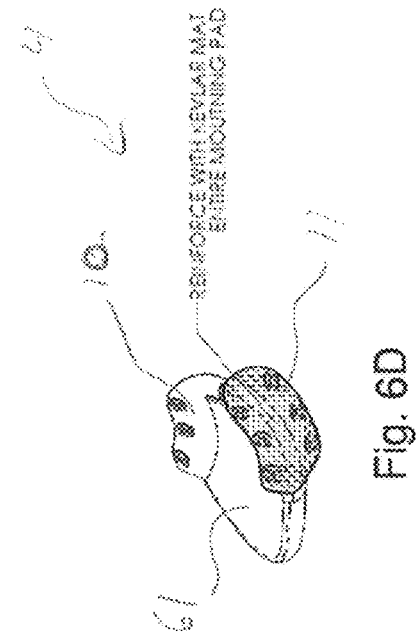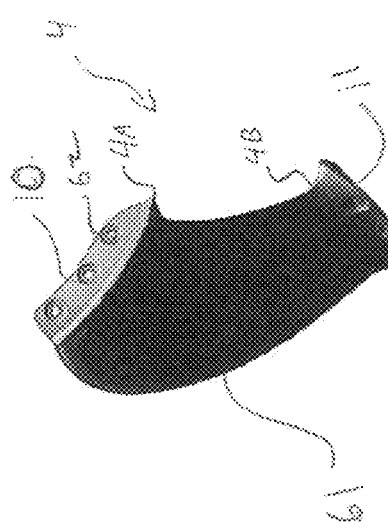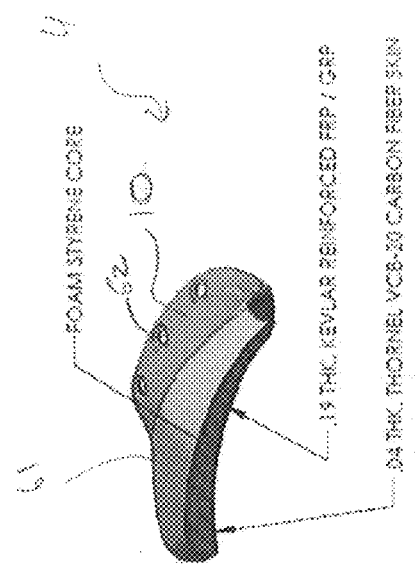

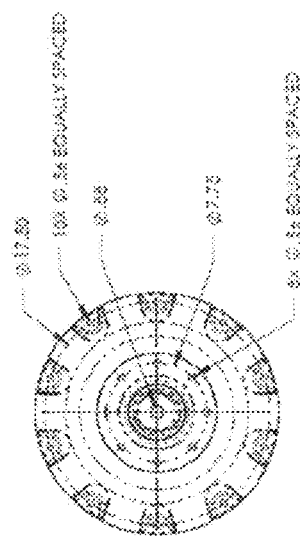
Fig. 8C
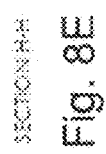
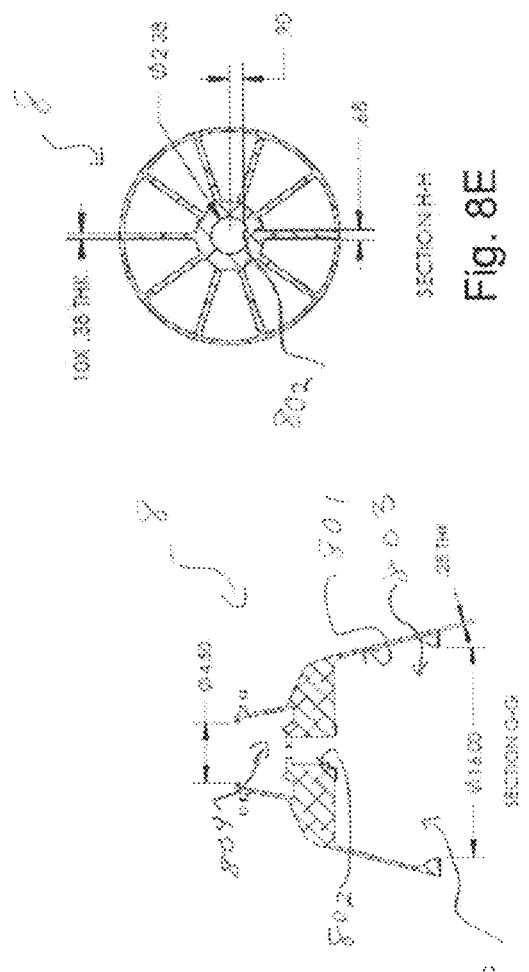
Fig. 8E
Fig. 8D
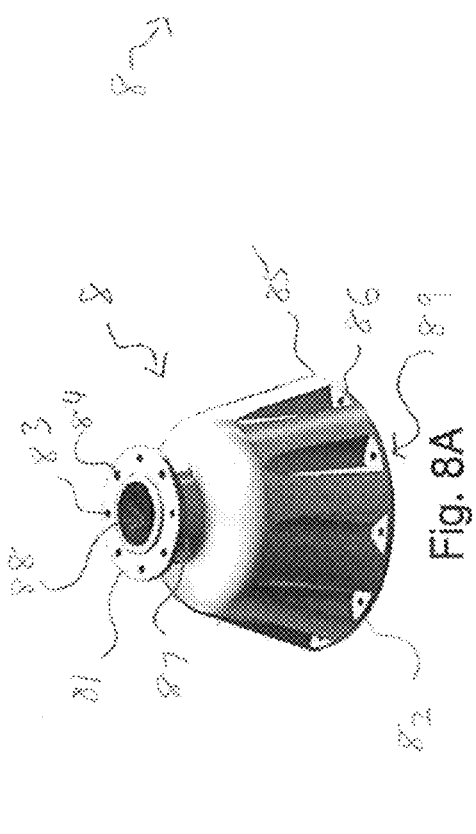
Fig. 8A
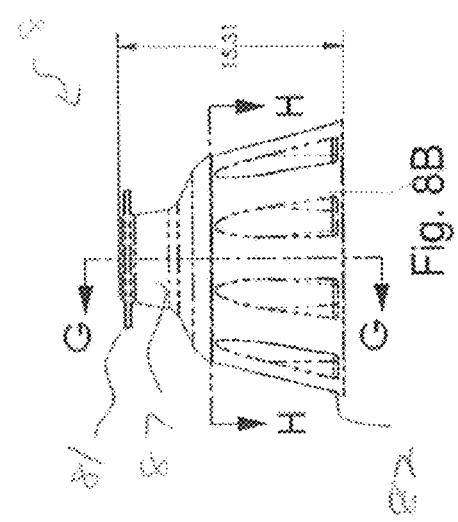
Fig. 8B

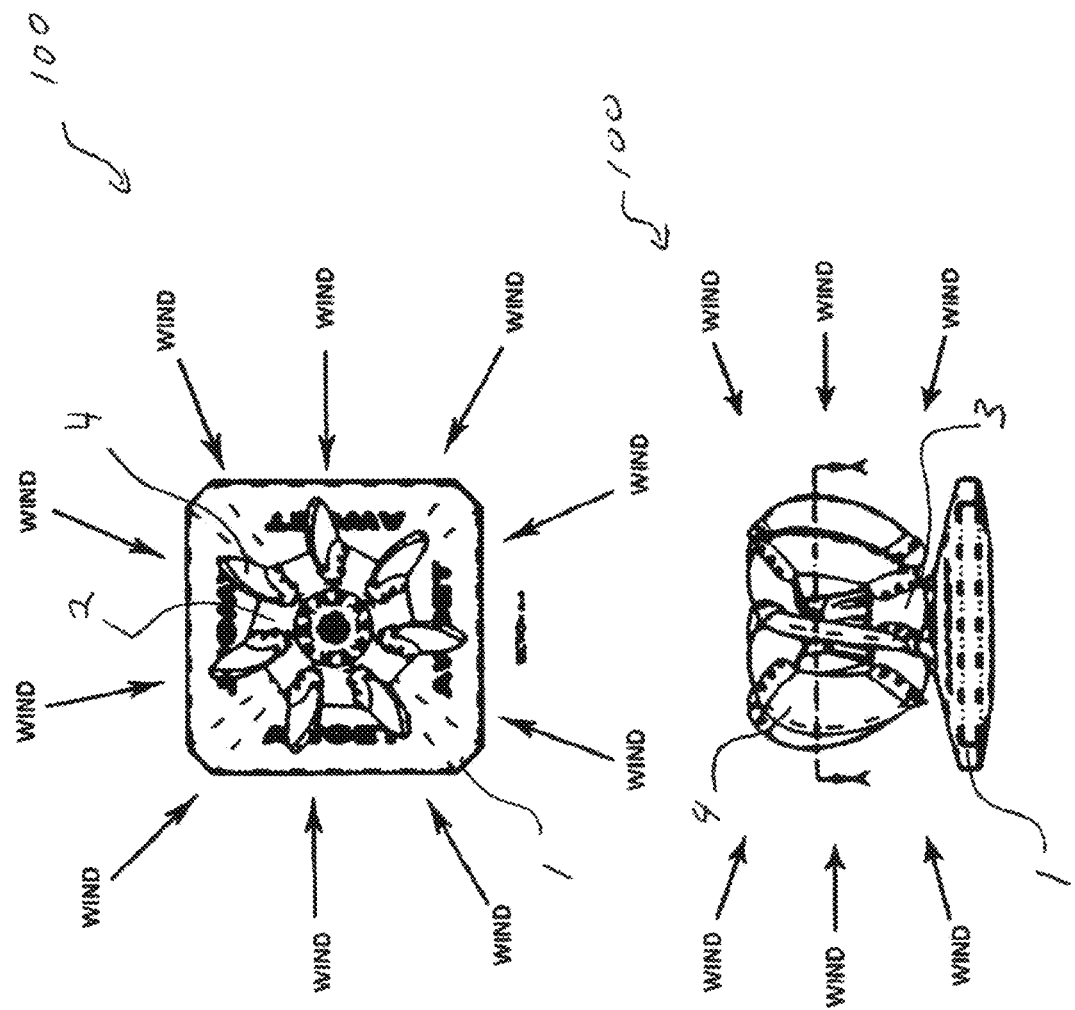

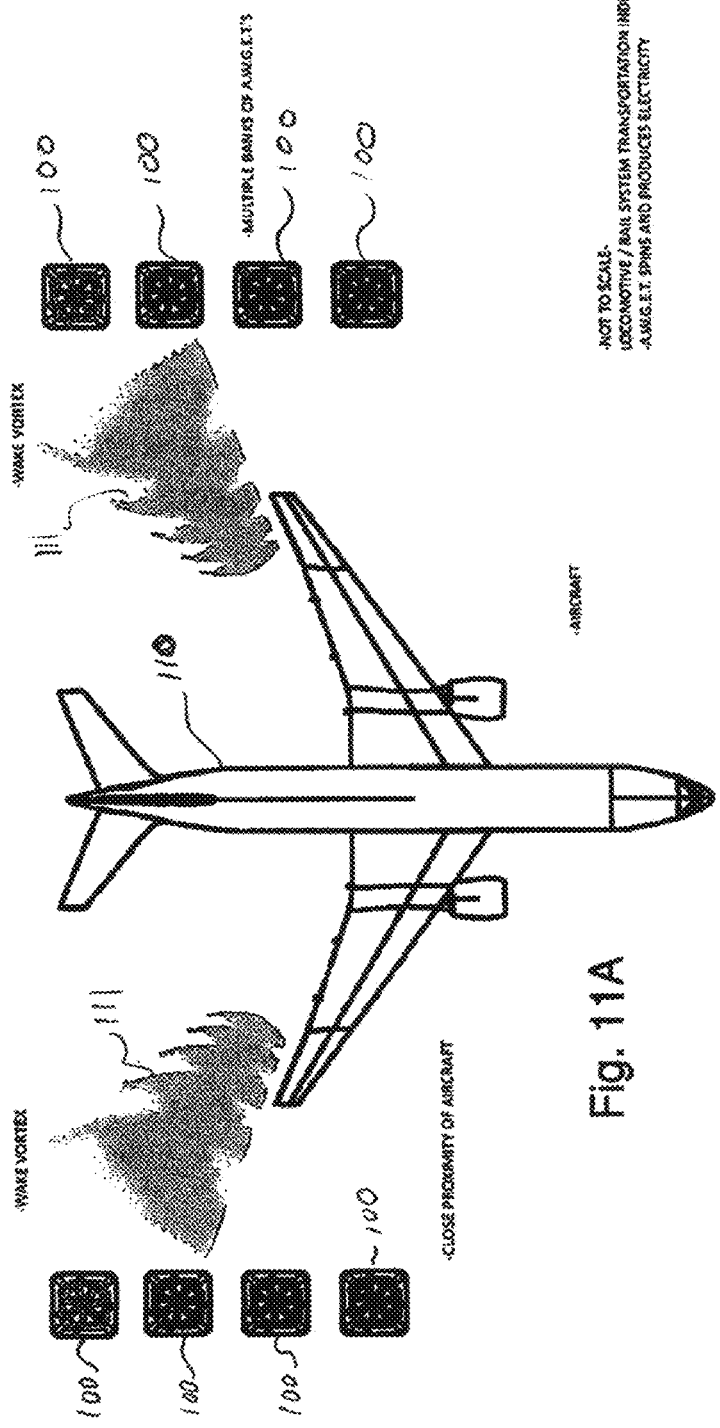
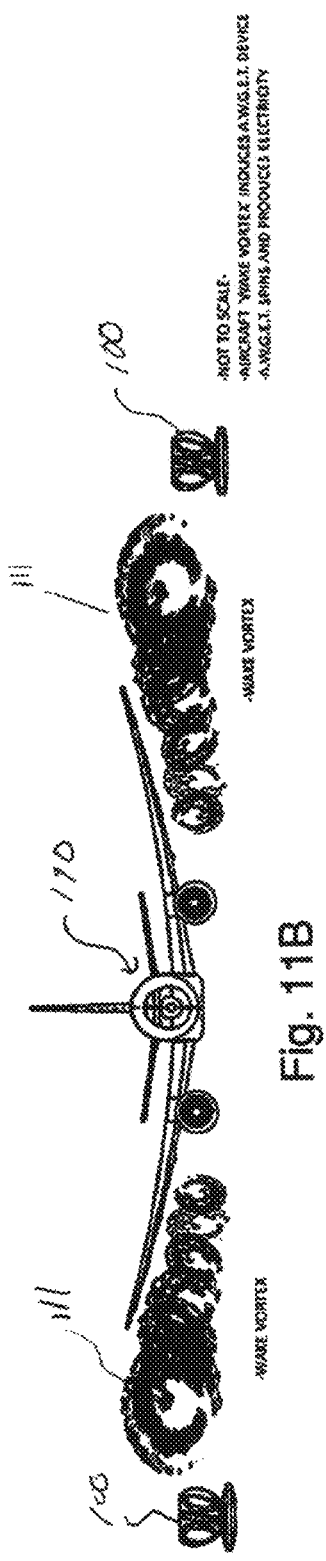
Fig. 11A
Fig. 11B

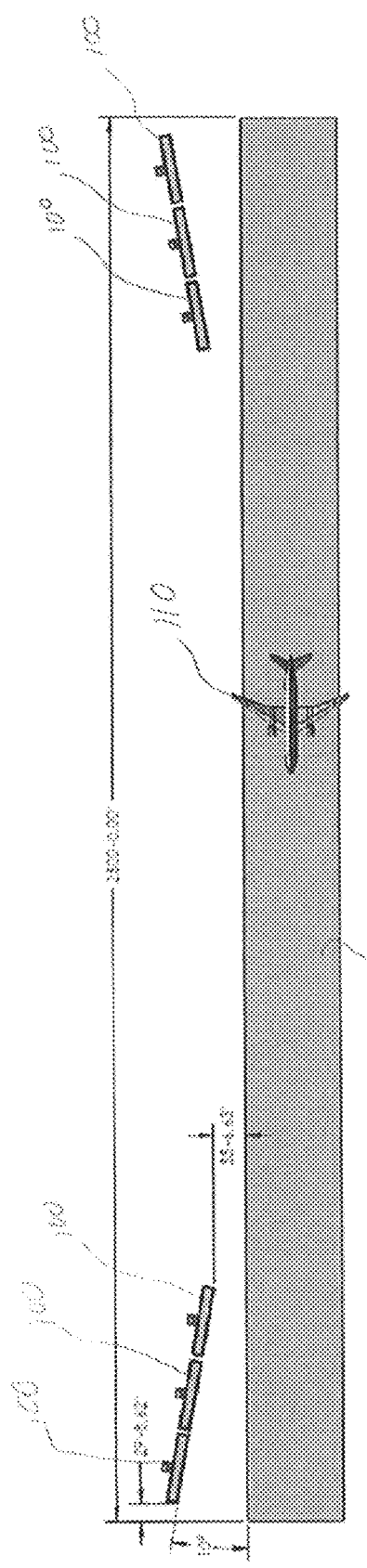
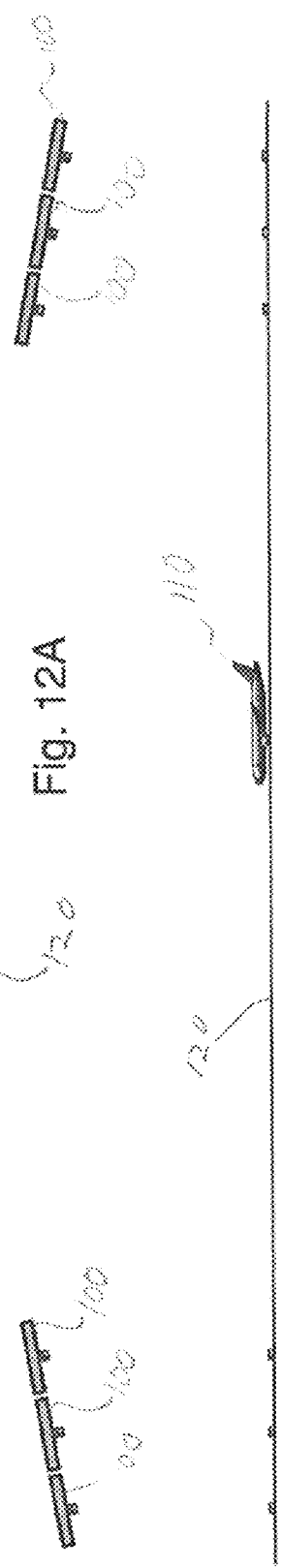
Fig. 12A
Fig. 12B

WIND POWER GENERATOR SYSTEM, APPARATUS, AND METHODS

CROSS-REFERENCE TO RELATED APPLICATIONS

This application claims priority to Provisional Application No. 61/211,100, filed Mar. 26, 2009, which is incorporated herein by reference in its entirety.

BACKGROUND OF THE DISCLOSURE (1) Field of the Disclosure

The present disclosure relates generally to a wind turbine generator assembly and systems and methods of use thereof.

(2) Description of Related Technology

Wind energy is becoming increasingly important as the world is searching for clean energy alternatives. Dependence on fossil fuels is costly and has a negative impact on the environment. Solar energy and hydro-electric dams are viable alternatives but are limited in their use due to the need for consistent sunlight and space for large solar panel arrays and large bodies of water to power a dam. While nuclear energy is clean, there are the costly issues of storing nuclear waste for eternity and building new plants.

The current challenge of wind power technology is finding enough clear, open, windy spaces to place towers that are typically up to 100' tall with average blade sizes of 50' to 70'. This technology is impractical for urban areas or locations in or near airports. U.S. Airports currently using wind technology have traditional wind turbines outside of the airport itself or have shorter turbines mounted on top of buildings within the airport. These applications do not take advantage of the surface currents of wake vortex winds.

While the related art teach wind turbines for generating electricity, there still exists a need for an apparatus and system to generate electricity using wind generated by human activity such as airplanes, rail systems, and/or vehicle traffic.

OBJECTS

Therefore, it is an object of the present disclosure to provide an apparatus and systems thereof for utilizing untapped wind generated by human activity to generate electricity.

These and other objects will become increasingly apparent by reference to the following description.

SUMMARY

The present disclosure provides a wind power generation system comprising: (a) an aircraft landing surface, wherein: (i) the landing surface has a proximal end and a distal end, (ii) the landing surface has a length L defined by a distance between the proximal end and the distal end, (iii) the landing surface defines a landing centerline from the proximal end to the distal end, and (iv) the landing surface defines a reference level elevation; (b) a wind capture region external to the landing surface and laterally positioned at a normal distance N (e.g., ranging from 200 ft to 250 ft or 400 ft to 450 ft) away from the landing centerline; and (c) a wind turbine apparatus positioned in the wind capture region at an elevation H (e.g., ranging from 0 ft to 10 ft, ranging from less than 0 ft to −10 ft) relative to the reference level elevation of the landing surface. In an embodiment, the system further can comprise a second wind capture region with a wind turbine apparatus positioned therein external to the landing surface and longitudinally positioned at an axial distance A away from the proximal end or the distal end of the landing surface. Additionally or alternatively, the system can further comprise an object-free zone positioned between the landing surface and the wind capture region, and the normal distance N can range from 5 ft to 50 ft beyond the object-free zone.

Various embodiments of the above system are possible. For example, the landing surface can be sized and shaped to accommodate the horizontal takeoff or landing of an aircraft selected from the group consisting of a fixed wing aircraft, a rotorcraft, and combinations thereof. The wind capture region can represent a wake vortex capture region positioned to be exposed to wake vortices generated by an aircraft in the external environment upon horizontal takeoff, landing, or both. The wind capture region can define a longitudinal axis that is substantially parallel to the landing centerline or that is angled relative to the landing centerline. The system can comprises a plurality of wind capture regions at a plurality of normal distances N away from the landing centerline. The wind capture region can extend substantially the entire length L of the landing surface, or the wind capture region can extend a portion of the entire length L of the landing surface. The wind turbine apparatus can be adjustably positioned in the wind capture region so that the elevation H of the wind turbine apparatus is adjustably selectable.

The present disclosure also provides another wind power generation system comprising: (a) an aircraft landing surface, wherein: (i) the landing surface comprises a central landing surface, (ii) the landing surface further comprises a peripheral landing surface positioned around the central landing surface (e.g., extending to radial positions up to 100 ft) and defining a plurality of openings thereon, (iii) the central landing surface defines a landing center point of the aircraft landing surface thereon, and (iv) the central landing surface defines a reference level elevation; (b) a wind capture region radially positioned at a radial distance R away from the landing center point and vertically positioned at a location below the reference level elevation, wherein the wind capture region is in fluid communication with the external environment via the plurality of openings; and (c) a wind turbine apparatus positioned in the wind capture region at an elevation H (e.g., ranging from less than 0 ft to −10 ft) below the reference level elevation of the central landing surface.

Various embodiments of the above system are possible. For example, the central landing surface can be sized and shaped to accommodate the vertical takeoff or landing of an aircraft selected from the group consisting of a winged aircraft, a rotorcraft, or combinations thereof. The wind capture region can represent a downwash capture region positioned to be exposed to downwash airflows generated in the external environment by an aircraft upon vertical takeoff, landing, or both. The system suitably comprises a plurality of wind capture regions at a plurality of tangential positions θ around the landing center point. The wind turbine apparatus can be capable of capturing vertically directed wind currents through the openings in the peripheral landing surface.

Any of the above systems in any of their various embodiments can be utilized in methods of generating electricity. The method generally comprises: (a) providing a wind power generation system according to any of the variously disclosed embodiments; and (b) exposing the wind turbine apparatus of the wind power generation system to wind generated by an aircraft upon takeoff, landing, or both (e.g., horizontal or vertical takeoff) from the landing surface. The wind turbine apparatus in any of the various systems or methods can be a horizontal axis turbine and/or a vertical axis turbine, for example mono- or multi-directional turbine capable of withstanding wind speeds up to 200 mph. Any of the various systems can further comprise: (d) a collection means for collecting electricity generated by the wind turbine apparatus upon exposure of the wind turbine apparatus to wind generated by an aircraft upon takeoff, landing, or both from the landing surface; and (e) a delivery means for delivering the electricity from the collection means to a desired location. Accordingly, the electricity generation methods can additionally include collecting and delivering the generated electricity.

The present disclosure also provides a method of constructing a wind power generation system. The method generally comprises: (a) identifying an aircraft landing surface and its surrounding environment; (b) identifying an aircraft that takes off and/or lands on the aircraft landing surface; (c) identifying any spatial constraints for the placement of a wind turbine apparatus in relation to the aircraft landing surface; (d) determining wind flow patterns (e.g., by computational fluid dynamics and/or empirical anemometric measurement) around the aircraft landing surface and in the surrounding environment that are generated upon takeoff or landing of the aircraft on the aircraft landing surface; (e) identifying a placement location for the wind turbine apparatus based on the determined wind flow patterns and any identified spatial constraints; and (f) installing the wind turbine apparatus in the identified placement location. The spatial constraints can include at least one of a maximum elevation H and a minimum elevation H relative to a reference level elevation defined by the aircraft landing surface. Additionally or alternatively, the spatial constraints can include at least one of a maximum distance D and a minimum distance D relative to a spatial reference defined by the aircraft landing surface. In an embodiment, part (e) can include identifying a spatial location as the placement location that experiences a local maximum air velocity transient for a takeoff or landing event of the aircraft as determined in part (d). Additionally or alternatively, part (e) can include identifying a spatial location as the placement location that maximizes the power generated by the wind turbine apparatus for a takeoff or landing event of the aircraft.

The present disclosure provides a wind generator turbine apparatus comprising: (a) a base for supporting the apparatus; (b) a base mount mounted on the base; (c) a permanent magnet generator (PMG) seated on the base mount, the permanent magnet generator comprising an aligned shaft extending along an elongated axis defined by the shaft and adapted to generate electricity when caused to spin circularly; (d) a wind turbine comprising: i. a housing mounted over and around the shaft of the PMG about the axis having a first end and a second end; ii. a plurality of blades (1) circumferentially arranged about the axis defined by the shaft of the housing, (2) extending along with the axis of the shaft, and (3) mounted between a first and a second linkage member, wherein the first linkage member is mounted on the first end of the housing and the second linkage member is mounted on the second end of the housing; iii. a linkage cap mounted on the first linkage member and the first end of the housing, wherein the shaft is caused to spin about the axis when wind force is applied to the blades to generate electricity. In an exemplary embodiment, the axis is a vertical axis and the base is mounted to the ground. Each blade is comprised of: (i) a first isolator pad at one end; (ii) a second isolator pad at an opposite end; and a (iii) a blade surface disposed between the upper and lower pad and adapted for receiving force created by wind to cause the blades to spin on the shaft. The turbine can define a generally elliptical or toroidal profile. In a further embodiment, the base is constructed of concrete and is sufficiently heavy to prevent the apparatus from lifting in the presence of high winds. In an even further embodiment, the first and second linkage members are aligned about the axis of the shaft and each define a curved surface to allow for mounting of the blades on the linkage members such that the ends of the blade are unaligned with respect to each other. The blades can be shaped and configured to cause a force towards the base when caused to spin in the presence of wind. Typically the blades define a curvature wherein the upper and lower isolator pads are unaligned with respect to each other. In a particular embodiment, the apparatus is up to about six feet in height and up to about seven feet in diameter.

In an exemplary embodiment, the apparatus is adapted to generate electricity in an environment exposed to man made wind. The environment can be an airport where the man made wind is created by aircraft. The man made wind can also be created by rail systems. The rail systems are selected from the group consisting of subway, passenger, freight, and combinations thereof. The environment can also be roadways where the man made wind is created by vehicle traffic. The vehicle traffic includes automotive vehicles and heavy trucks. The blades are constructed to capture wake vortex currents from any direction. In a particular embodiment, the apparatus is adapted to operate in close proximity of up to 100 feet in an environment that generates man made wind. The base is adapted to be mounted to the ground in order to place the wind blades close to the ground. In a further embodiment, the wind turbine apparatus is constructed to withstand up to about 200 mph wake vortex wind and is adapted to turn at a rotational speed of the shaft of 200 rpm. The turbine can be constructed so that one hour of turning generates up to 5000 watts of electricity.

The present disclosure further provides for a wind generator turbine apparatus comprising: (a) a base for supporting the apparatus; (b) a base mount mounted on the base; (c) a permanent magnet generator (PMG) seated on the base mount, the permanent magnet generator comprising a vertically aligned shaft extending along a vertical axis defined by the shaft and adapted to generate electricity when caused to spin circularly; (d) a wind turbine comprising: i. a housing mounted over and around the shaft of the PMG; ii. a plurality of blades circumferentially arranged about the vertical axis of the shaft of the housing, each blade is comprised of: (1) an upper isolator pad; (2) a lower isolator pad; and a (3) a blade surface disposed between the upper and lower pad and adapted for receiving force created by wind to cause the blades to spin on the vertical axis of the shaft; iii. an upper linkage member mounted to: (i) each of the blades through each of the upper isolator pads; and (ii) a first end of the PMG housing; iv. a lower linkage member mounted to: (i) each of the blades through each of the lower isolator pads; and (ii) a lower end of the housing; v. an upper linkage cap mounted on the upper linkage member and the upper end of the PMG housing and connected to the shaft wherein the shaft is caused to spin about the vertical axis when wind force is applied to the blades to generate electricity. The upper and lower linkage members can be aligned about the vertical axis of the shaft and each define a curved surface to allow for mounting of the blades to the linkage members. The blades can be shaped and configured to cause a downward force towards the base when caused to spin in the presence of wind. Typically, the blades define a curvature wherein the upper and lower isolator pads are unaligned with respect to each other.

The present disclosure further provides for a system for generating electricity in the presence of man made wind comprising: (a) an environment that is exposed to man made wind; (b) the apparatus of claim 1 positioned in the environment to allow the wind to apply force to the blades; (c)

collection means for collecting the electricity generated by the apparatus when a force created by the wind causes the blades to turn; (d) delivery means for delivering the electricity from the collection means to desired locations. In a particular embodiment, the system comprises a plurality of apparatus as a bank wherein the apparatus are positioned close to each other and each apparatus is providing electricity to the collection means. In a further embodiment, the blades of one apparatus spinning at 190 to 210 rpm for one hour can generate up to about 5000 watts. An exemplary system comprises six banks of 24 apparatus and generates up to 2,592 megawatt hours of electricity. The environment can be an airport comprised of at least one runway upon which a plurality of aircraft movement generates the man made wind. The apparatus can be positioned within 5 to 50 feet of the object free zone (OFZ) of the runway. In a particular embodiment, the environment is a roadway with a plurality of vehicle movement, wherein the vehicles are selected from the group consisting of automobiles, heavy trucks, and combinations thereof. The apparatus can be positioned within 10 to 15 feet of the roadway. In a further embodiment, the environment is a railway system with a plurality of rail car movement, wherein the rail system is selected from the group consisting of subway train, freight train, passenger train, and combinations thereof. The apparatus can be positioned within 5 to 10 feet of the rail system.

The present disclosure provides for a method for generating electricity from wind comprising the steps of: (a) providing at least one apparatus as described above; and (b) exposing the apparatus to wind. The wind can be man made.

BRIEF DESCRIPTION OF THE DRAWINGS

FIG. 2 illustrates an exploded view the apparatus of FIG. 1.

FIGS. 3A and 3C illustrate an exemplary base of the apparatus of FIG. 1 including a perspective view and a top side view.

FIG. 3B illustrates an exemplary base mount of the apparatus of FIG. 1.

FIGS. 4A-4D illustrate different views of an exemplary first linkage member of the apparatus of FIG. 1 including a perspective view, top side view, side view, and a cross section C-C view.

FIGS. 5A-5D illustrate different views of an exemplary second linkage member of the apparatus of FIG. 1 including a perspective view, top side view, side view, and a cross section D-D view.

FIGS. 6A-6D illustrate different views of an exemplary blade of the apparatus of FIG. 1 including a perspective view, side view, end side view, and a cross section E-E view.

FIGS. 8A-8E illustrate different views of an exemplary housing of the apparatus of FIG. 1 including a perspective view, top side view, side view, cross section G-G view, and cross section H-H view.

FIGS. 10A-10B illustrate a top side view and a side view of the apparatus of FIG. 1 exposed to wind from a plurality of directions.

FIGS. 11A-11B illustrate a system of a plurality of apparatus of FIG. 1 positioned near an airplane including a top side view and a rear side view.

FIGS. 12A-12B illustrate a system of a plurality of apparatus of FIG. 1 positioned near an airplane on a runway including a top side view and a side view of the runway.

DESCRIPTION OF PREFERRED EMBODIMENTS

All patents, patent applications, government publications, government regulations, and literature references cited in this specification are hereby incorporated herein by reference in their entirety. In case of conflict, the present description, including definitions, will control.

Wind Generator Turbine Apparatus

Figure 1C:
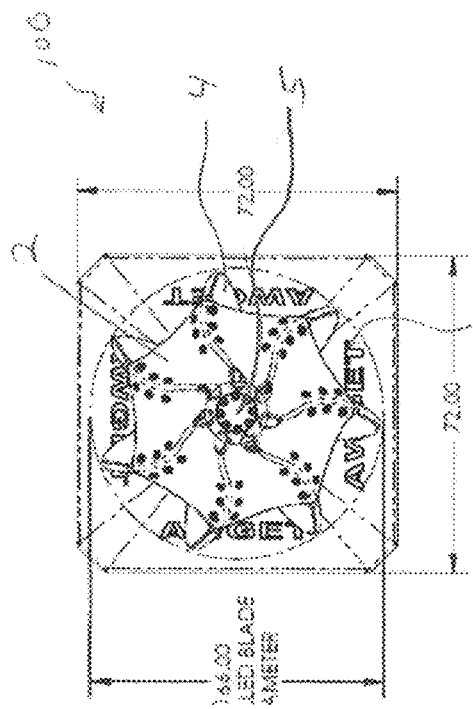
FIGS. 1A-1D illustrate different views of an exemplary wind generator turbine apparatus including a perspective view, top side view, side view, and a cross section A-A view.
Figure 1D:
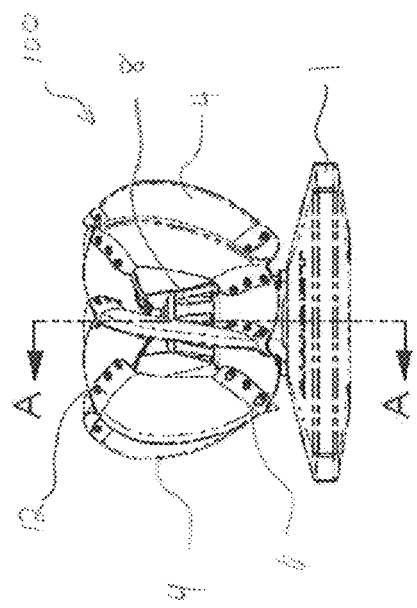
Figure 1A:
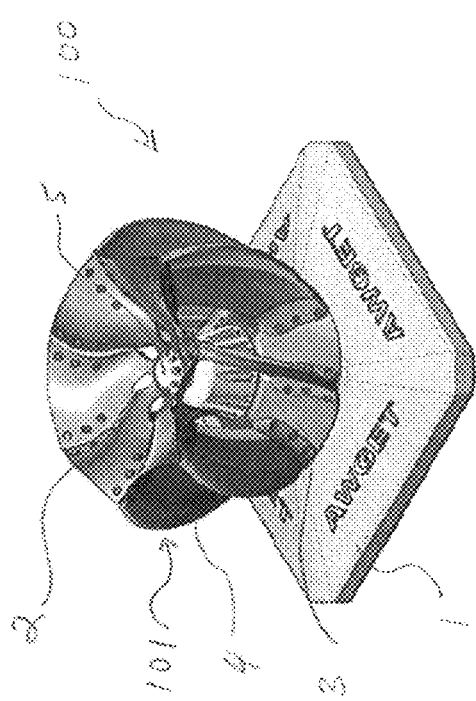
Figure 1B:
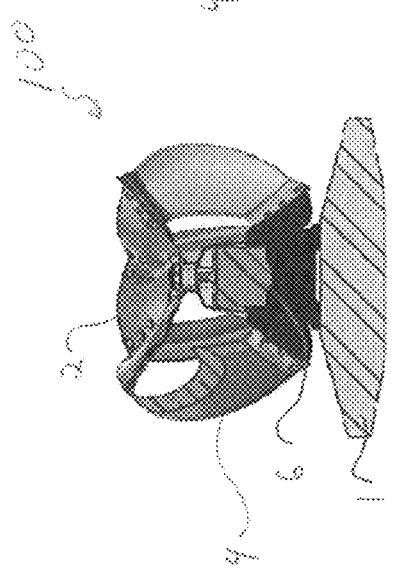
Figure 7C:
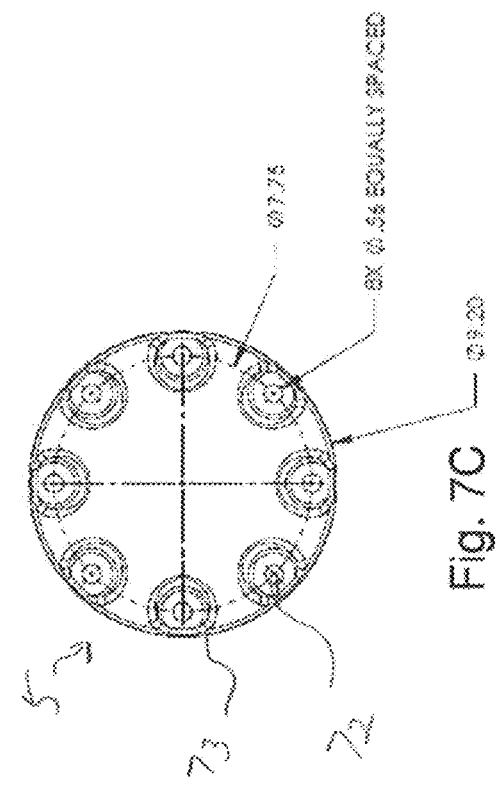
FIGS. 7A-7D illustrate different views of an exemplary linkage cap of the apparatus of FIG. 1 including a perspective view, top side view, side view, and a cross section F-F view.
Figure 7D:
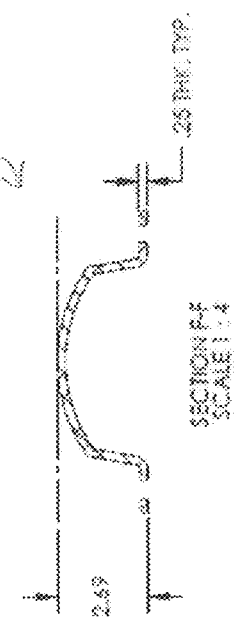
Figure 7A:
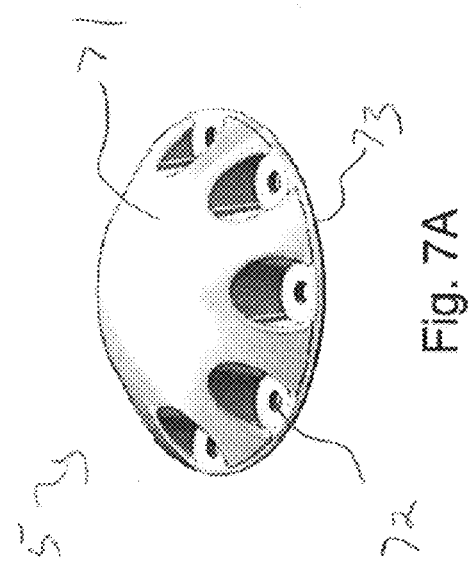
Figure 7B:
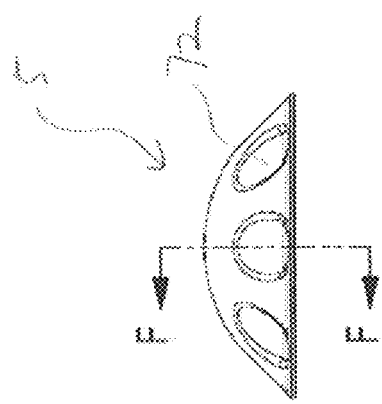

Referring to FIGS. 1A-FIG. 2, an exemplary wind generator turbine apparatus is shown. FIG. 1A, 1B, 1C, and 1D show different views of an assembled apparatus 100. FIG. 2 illustrates an exploded view of apparatus 100. Apparatus 100 comprises a base 1 that allows for mounting of base mount 9. Base mount 9 allows for mounting of a wind turbine 101 that comprises a permanent magnet generator (PMG) 6. Extending out of the PMG and defining an axis X-X is shaft 13. Shaft 13 engages a housing 8 through a keying means to be discussed later. Housing 8 is mounted between a first linkage member 2 and a second linkage member 3. A plurality of blades 4 are circumferentially mounted between the linkage members 2 and 3 and about the axis X-X of the shaft 13. A linkage cap 5 is mounted on to linkage member 2 thereby holding the construction of wind turbine 101 together.

An exemplary apparatus 100 comprises a base 1 for mounting a wind turbine 101. Base 1 is typically formed of concrete and is relatively heavy, weighing up to about 5,000 lbs. As shown in FIG. 3A and 3C, base 1 is typically substantially rectangular or square defining four ramped surfaces 31, all leading to a mounting surface 32. Mounting surface 32 is also typically square or rectangular in geometry and allows for mounting of base mount 9. Mounting surface 32 comprises four mounting members 7 (FIG. 2), such as bolts or screws extending away from surface 32 and engaging base mount 9. Mounting members 7 are typically spaced apart and positioned in each corner of surface 32. Mounting members 7 engage base mount 9 through mounting holes 34 defined on base mount 9 as shown in FIG. 3B. In an exemplary embodiment as shown in the top view of FIG. 3C, base 1 comprises four 72 inch sides and four cut-off slanted corners, typically at 45° angles with respect to each side.

Base mount 9 is constructed for mounting turbine 101 to base 1. Typically base mount 9 comprises four outward and radially, with respect to the vertical axis X-X, extending leg members 33 that each define a mounting hole 34. Mounting surface 37 is generally circular and defines a cavity 35. An abutment lip 36 is provided in cavity 35 that extends inward towards axis X-X as a structural support to PMG 6 during mounting of turbine 101 to base mount 9. Lip 36 is circumferentially constructed around axis X-X. Mounting surface 37 defines equidistant mounting holes 38 spaced apart circumferentially on surface 37 to engage PMG 6. Each hole can receive a bolt or have a bolt extending away from mount 9 and engage a mount (not shown) on the bottom surface of PMG 6.

FIGS. 4A-5D illustrate first and second linkage members 2 and 3 respectively. FIGS. 6A-6D illustrate an exemplary blade 4. A plurality of blades 4 are mounted between first linkage member 2 and second linkage member 3. In a particular embodiment, first and second linkage members 2 and 3 are referred to upper and lower linkage members 2 and 3, particularly when axis X-X is a vertical axis. All of the parts of turbine 101 are aligned with respect to axis X-X. The blades are configured circumferentially around and extending parallel with axis X-X. Typically the blades 4 are slightly angled to axis X-X based on the constructed curvature. Blade 4 is comprised of: (i) a first isolator pad 10 at one end 4A; (ii) a second isolator pad 11 at an opposite end 4B; and a (iii) a blade surface 61 disposed between the upper 10 and lower 11 pad. Moreover, pads 10 and 11 can be referred to as mounting pads 10 and 11. Blade 4 is adapted for receiving force created by wind to cause the blades 4 to spin about the shaft 13. In a particular embodiment, blade 4 can define a curvature wherein the first 10 and second 11 isolator pads are unaligned with respect to each other. In an exemplary embodiment, turbine 101 is comprised of seven blades 4 spaced apart equidistant from each other in a circular configuration.

Blades 4 are designed using fluid dynamic technology and constructed in such a way to withstand high force winds originating from but not limited to aircraft, rail-type transportation, and automotive/heavy truck vehicles, etc. The blades 4 can be constructed of a carbon fiber with Kevlar™ reinforced FRP structure and a foam styrene core in order to be light and strong. Surface 61 is generally smooth and relatively broad to interact with wind in the presence of wind. This creates a force against surface 61 and thus movement of the blades rotationally about axis X-X. The blades 4 can be molded in a form similar to an aircraft wing. The shape and placement of the blades 4 can direct the force of the spinning turbine towards the base 1 or downward in a vertical configuration. In a particular embodiment, the blades and core are designed to withstand constant 120 mph wake vortex wind speeds. Most wind turbines are subjected to average wind speeds of 20 mph.

Mounting pads 10 and 11 can be reinforced with Kevlar mat to provide additional structural support. Mounting pads 10 and 11 are constructed in a substantially V configuration with each leg of the V defining three mounting holes 62. Pad 10 defines the V configuration opening towards first linkage member 2. Pad 11 defines the V configuration opening towards second linkage member 3. The mounting holes 62 allow for mounting the blades 4 to the linkage member 2 and 3 at the pads 10 and 11 respectively. Accordingly, each hole 62 is aligned with a corresponding hole on the surface of the linkage member 2 and 3.

First linkage member 2, shown in FIGS. 4A-4D, defines a generally pinwheel profile as seen in FIG. 4C. Each surface section 41 defines six mounting holes 42, three along each side 44. The surfaces 41 extend radially with respect to axis X-X and away from mounting surface 43 thus forming a generally concave or bowl construction or appearance. Thus, surface 41 gets progressively wider as it extends away from mounting surface 43. Mounting surface 43 defines a circular opening 47 and a plurality of circumferentially spaced apart mounting holes 46 for mounting linkage member 2 to housing 8. The sides 44 of each surface 41 are typically curved. This allows for mounting with a curved blade 4. The intersection of two surfaces 41 forms obtuse angled corners at the sides 44. Mounting holes 42 are thus defined in a V configuration to align properly with mounting holes 62 of blade 4. Blade 4 is mounted to first linkage member 2 with a mounting feature such as a bolt or a screw through holes 42 and 62 of mounting pad 10. Each surface 41 can define an irregular opening 45 that allows air to pass through without disrupting the fluid flow of the turbine 101. Typically, opening 45 is positioned at the intersection of sides 44 from the different surface sections 41.

Second linkage member 3, shown in FIGS. 5A-5D, defines a generally pinwheel profile as seen in FIG. 5C. Each surface section 51 defines six mounting holes 52, three along each side 54. The surfaces 51 extend radially with respect to axis X-X and away from mounting surface 53 thus forming a generally concave or bowl construction or appearance. Thus, surface 51 gets progressively wider as it extends away from mounting surface 53. Mounting surface 53 defines a circular opening 57 about axis X-X and a plurality of circumferentially spaced apart mounting holes 56 for mounting linkage member 2 to housing 8. The sides 54 of each surface 51 are typically curved. This allows for mounting with a curved blade 4. The intersection of two surfaces 51 forms obtuse angled corners at the sides 54. Mounting holes 52 are thus defined in a V configuration to align properly with mounting holes 62 of blade 4. Blade 4 is mounted to first linkage member 2 with a mounting feature such as a bolt or a screw through holes 42 and 62 of second mounting pad 11. Generally, opening 57 is larger than opening 47 of the first linkage member 2. Apparatus 100 can be constructed to define a generally elliptical or toroidal profile.

FIGS. 7A-7D illustrate a linkage cap 5. Linkage cap 5 defines a substantially curved and smooth surface 71 is generally circular about axis X-X. Typically cap 5 defines a plurality of mounting holes 72 spaced apart circumferentially around a rim 73. Each hole 72 is constructed to align with and engage with holes 46 of first linkage member 2. A mounting member such as a bolt or screw (not shown) is received through each hole 72 and 46 to securely mount cap 5 to linkage member 2. Moreover, the mounting features further engage housing 8.

Housing 8 defines a first end surface 81 that is generally circular about axis X-X. An opening 88 is defined in first end 81 that allows for shaft 13 to extend there through. First end 81 is connected to second end 82 through a connection portion 87. Second end 82 expands broadly and radially from axis X-X to define a cavity 89 that can fit over and around a PMG 6. Second end 82 defines a rim 85 with a plurality of mounting holes 86 along the perimeter of the rim 85. The holes 86 are configured to allow for mounting of housing 8 to second linkage member 3 at holes 56. First end 81 defines a rim 83 with a plurality of mounting holes 84 circumferentially along the perimeter of rim 83. Mounting holes 84 are configured to allow for mounting of housing 8 to first linkage member 2 at holes 46. Cavity 89 includes an interior surface 801. Surface 801 comprises a first section 803 and a second section 804. Section surface 804 defines a protruding keying boss 802 that engages a keying groove 902 of shaft 13 of PMG 8. This engagement of boss 802 and groove 902 allows for the shaft to be rotated in the presence of man made wind. The interaction of boss 802 with groove 902 connects shaft 13 to blades 4 such that turbine 101 will rotate in the presence of external force.

Figure 9C:
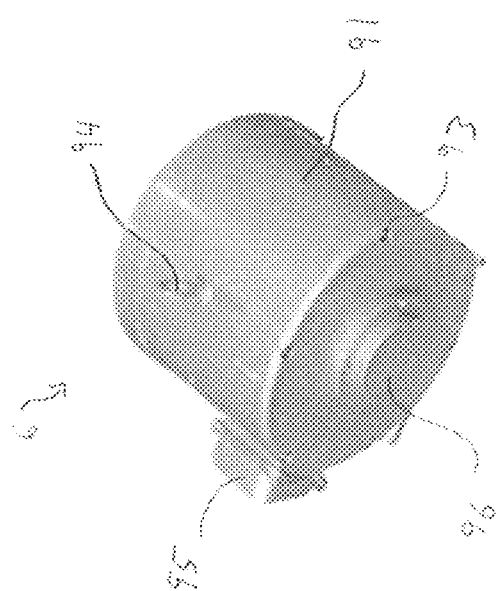
FIGS. 9A-9F illustrate various perspective views of an exemplary permanent magnet generator (PMG) of the apparatus of FIG. 1.
Figure 9D:
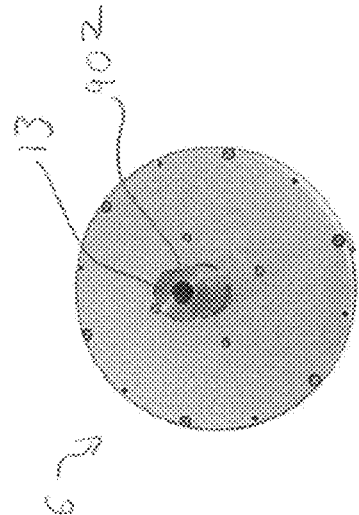
Figure 9A:
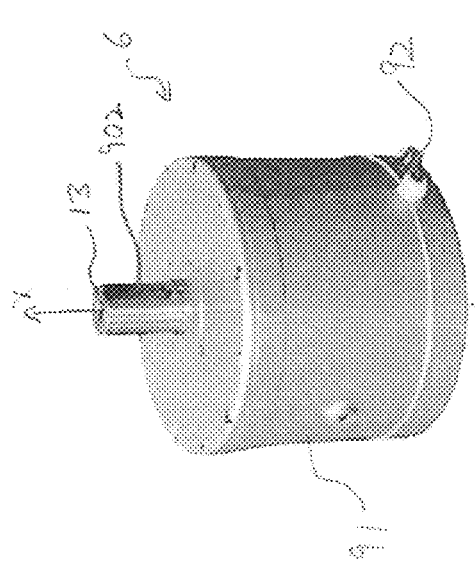
Figure 9B:
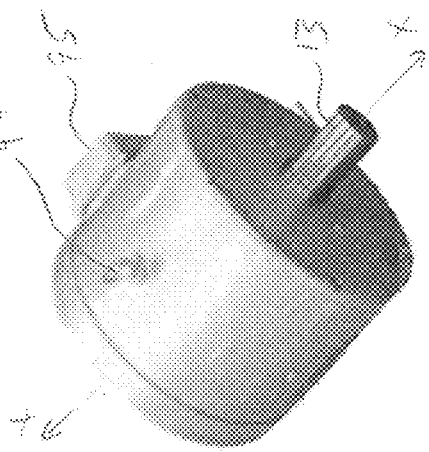
Figure 9E:
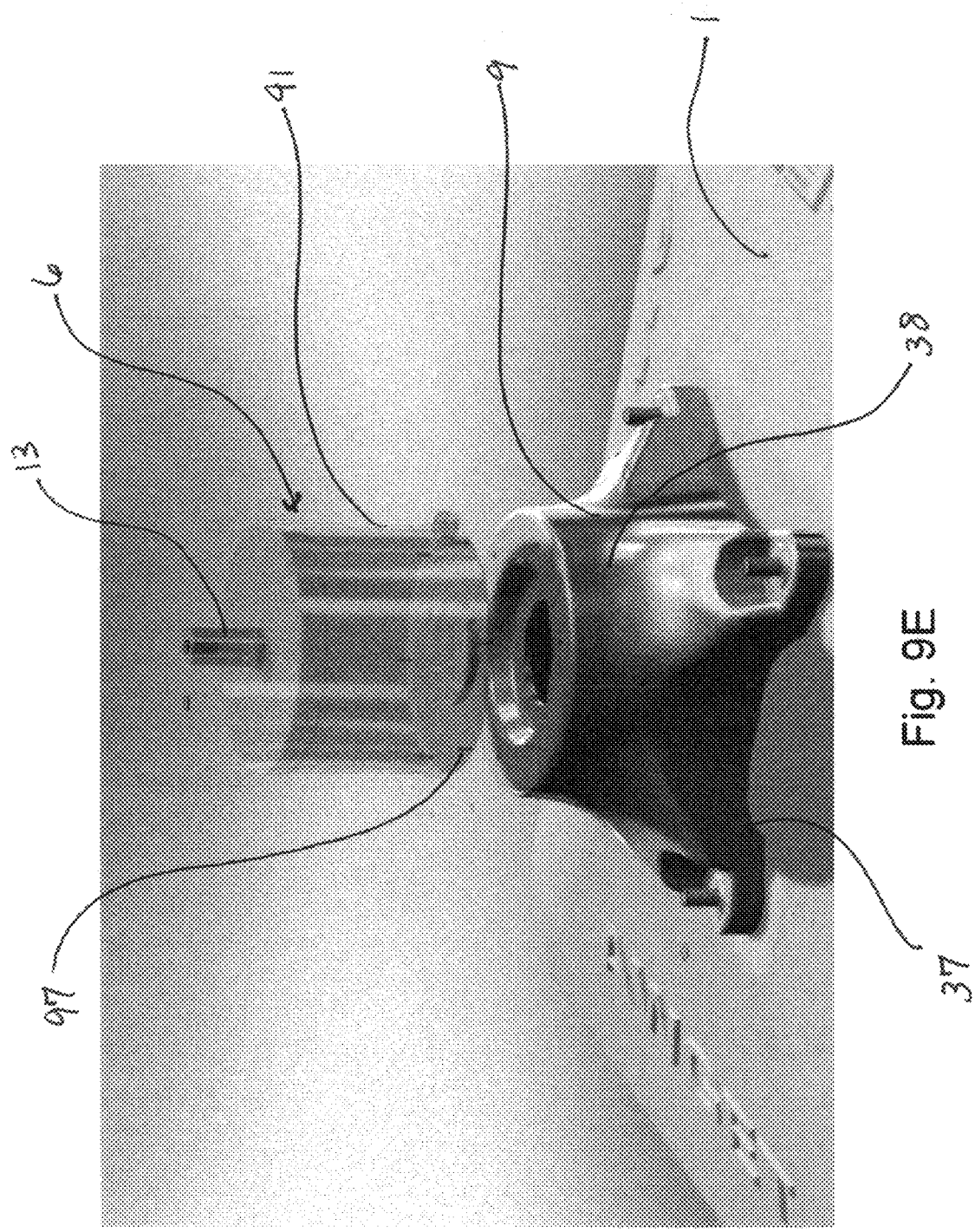
Figure 9F:
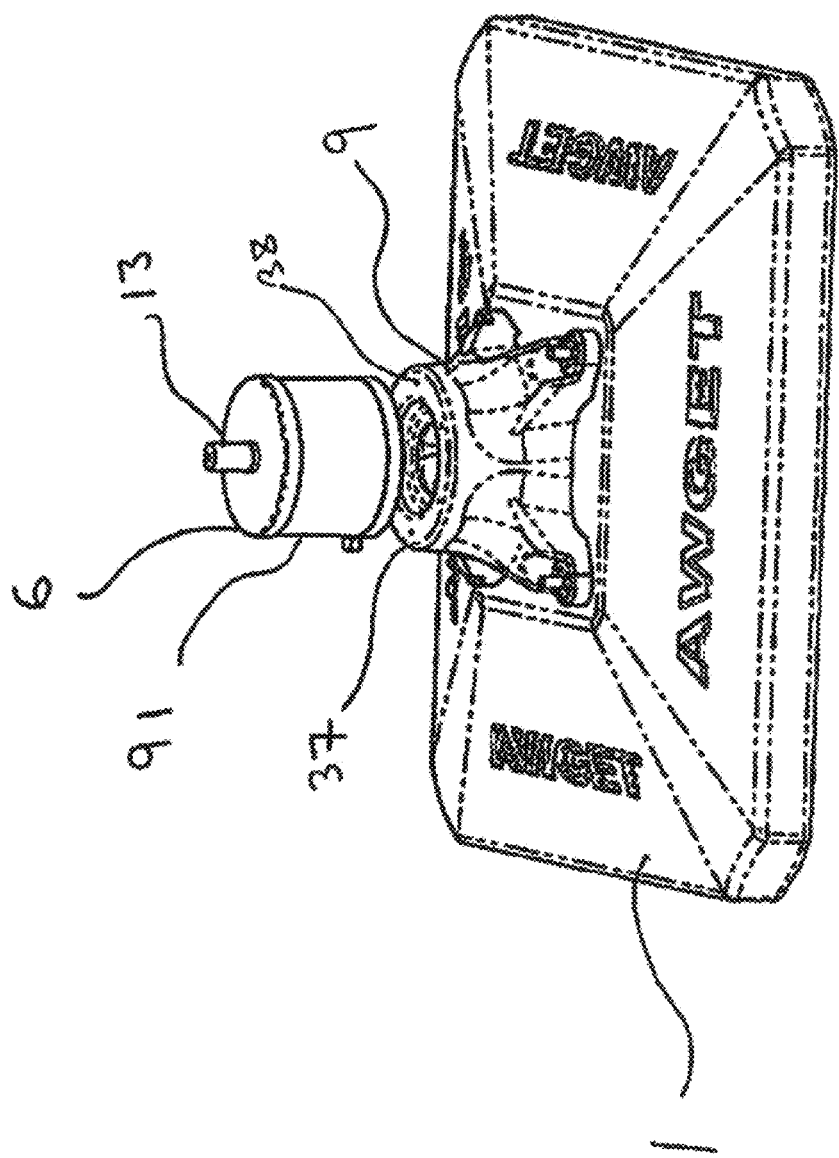

FIGS. 9A-9F illustrate an exemplary PMG 6 comprising a shaft 13. Shaft 13 engages housing 8 through the keying mechanism described above. PMG 6 includes a shell or housing 91 that is typically cylindrical. Shaft 13 defines an axis X-X that extends through the center of PMG 6. Shell 91 is constructed to be mounted on base mount 9 through mounting holes 93 that correspond to base mount 9 mounting holes 38. In the presence of man made wind, a force is applied to the surface 61 of blades 4 which causes them to rotate. Through the various connections described above, the rotation of the blades causes rotation of housing 8 which is engaged to shaft 13 causing shaft 13 to also rotate. Shaft 13 extends into shell 91 and is connected to a magnetic armature (not shown) inside shell 91. The spinning of the armature generates electricity that is collected in a commutator (not shown) connected to a brush (not shown) that is transferred through wires 92 to a bank. An eye or hook 94 is mounted on shell 91 to provide for easy lifting and maneuvering. A fuse box 95 for electrical control is also mounted on shell 91. Seating surface 96 is constructed to securely fit into the cavity 35 of base mount 9. The surface 96 lies flush with abutment lip 36. As shown in FIGS. 9E and 9F, PMG 6 is mounted to base mount 9 through a plurality of circumferentially arranged mounting bolts 97 that engage mounting holes 93. Bolts 97 can also be screws or pins in certain embodiments. PMG 6 is in abutment with mounting surface 37 when assembled. The mounting bolts 97 secure PMG 6 to base mount 9. The mount should be strong enough to prevent unintended movement and shaking when the turbine is turning in the presence of wind. Generally, bolts 97 are M8 bolts 97 and installed through the base mount 9 surface 37 via holes 38, leading upwards into the PMG 6 into holes 93.

FIGS. 10A and 10B illustrate a top view and a side view, respectively, of apparatus 100. Apparatus 100 can be exposed to wind from any direction. The construction of the blades 4 and the linkage members 2 and 3 allow for apparatus 100 to be omni-directional and thus functional regardless of the direction or source of wind.

Wind Power Generation Systems

Figure 13:
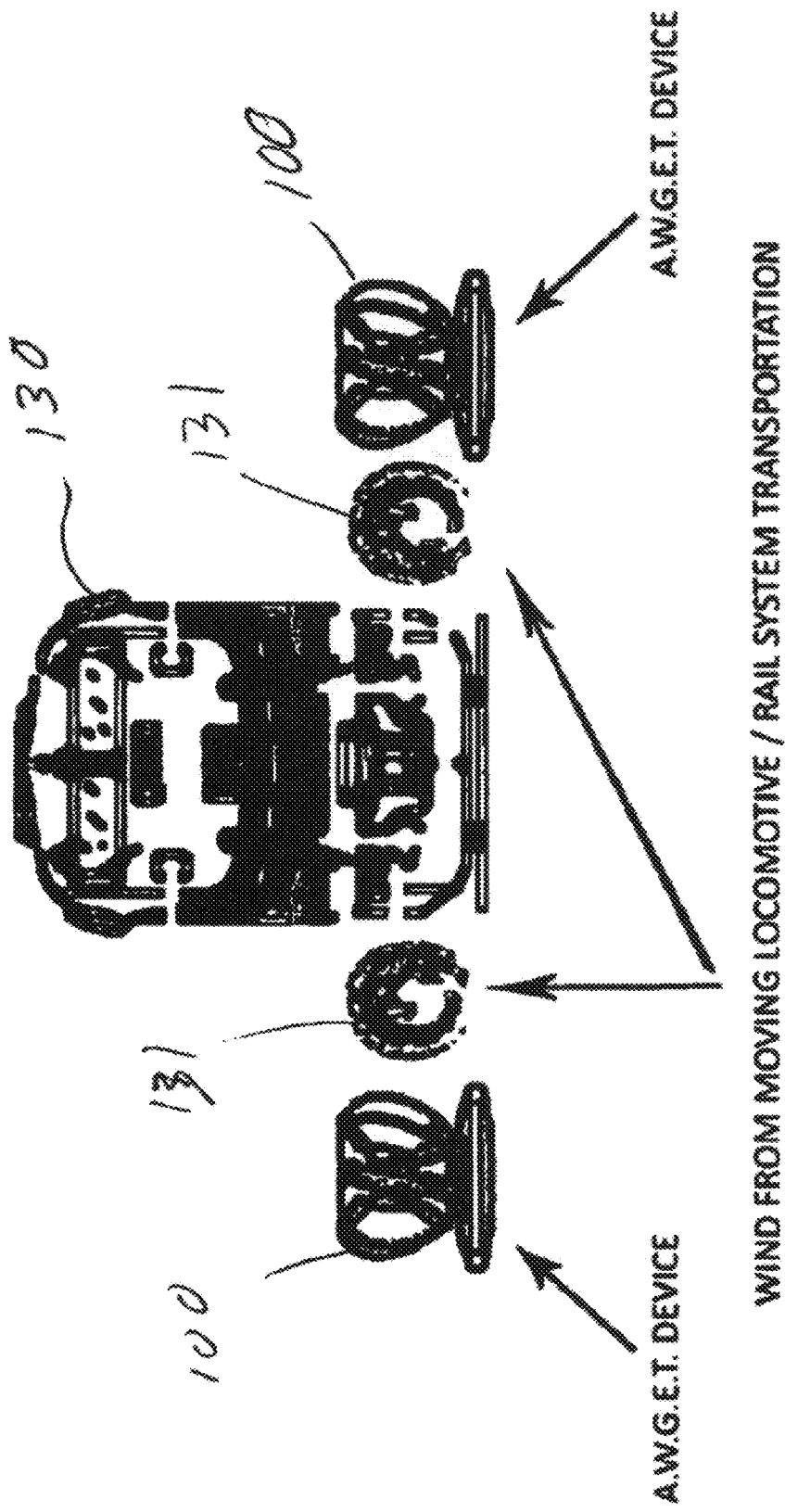
FIG. 13 illustrates a rear side view of a locomotive generating wind and driving between a system of apparatus of FIG. 1.

FIGS. 11A and 11B illustrate an exemplary system associated with the present disclosure. In an exemplary embodiment, a plurality of apparatus 100 are provided in close proximity to an environment of man made wind. For example, in an airport, a plane landing or taking off generates vast amounts of man made wind as shown in the drawings. Airplane 110 will generate wake vortex 111. This wind interacts with the apparatus 100 causing the blades to turn and thereby generating electricity. FIGS. 12A and 12B show an airplane 110 on a runway 120. A plurality of apparatus 100 is positioned near runway 120. The location of the apparatus 100 is close enough to receive the vast amounts of wind generated by the movement of the airplane 110. FIG. 13 shows a similar system with a plurality of apparatus 100 positioned near a locomotive 130 that generates wind 131.

Apparatus 100 is a generator that produces electricity by collecting man-made wind activity from, but not limited to, aircraft, rail-type transportation, automotive/heavy truck vehicles, etc. Airports are an integral part of most urban areas and an important part of any major economy. Air transportation is a vital link to the global marketplace, and large airports with all of their ancillary services are major consumers of electrical power. Apparatus 100 utilizes unused surfaces in and around airports by placing the omni-directional, low profile apparatus 100 in these areas to capture wake vortex wind currents created by aircraft taking off and landing. These wake vortex currents average 120 mph; the force of a category 3 hurricane. Typically, construction of apparatus 100 defines a substantially elliptical and/or torroidal profile. Because the shape is very efficient, the turbine blades 4 will capture wake vortex currents from any direction without the need for directional sensors. The relatively small size of the apparatus 100 allows for relatively close proximity, up to 120 feet, installation which includes but is not limited to: airfields/runways, rail systems (subway, passenger, freight, etc.), and automotive/heavy truck vehicle roadways.

The low profile of apparatus 100 is especially effective for airports where it is not possible to place tall wind towers due to radar shadows and interference with aircraft. Placing a plurality or a bank of apparatus 100 throughout a major urban airport could feasibly generate enough clean electricity to power all the operations of the airport and enough surplus clean electricity to sell to the surrounding community. Unlike tall wind propellers currently in use, the low profile of apparatus 100 reduces the risk of damage from bird collisions and has a minimal impact on the environment while it easily captures the currently unused, untapped wake vortex wind currents. In a particular embodiment, an apparatus bank is contained in a self-protected (fenced and gated) structure, allowing the wake vortex winds to flow past the mesh fence and rotate the apparatus within the bank.

In an exemplary embodiment, the housing 8 is fabricated from a combination of 3 mm glavaneal stampings for corrosion resistance and strength and aluminum castings. The base mount can be a 24-inch steel casting that mounts the entire turbine 101 to a 4973 lb. concrete base 1. The turbine 101 is designed to withstand constant 120 mph wake vortex wind speeds. Most wind turbines are subjected to average wind speeds of 20 mph. The shape of the wind turbine 101 is low profile, and extremely efficient in collecting wake vortex winds. The compact size enables multiple apparatus 100 to be placed close together in small or large groups to take full advantage of the available, unused airport spaces for maximum collection of the wake vortex winds. A collection of apparatus 100 is referred to as a bank. In an exemplary embodiment, one apparatus 100 turning at a rotational speed of the shaft of 200 rpm (77% efficiency) for one hour can generate 5000 watts of electricity. A bank of 24 apparatus 100 (in a 140'×40' area for example) spinning at 200 rpm for one hour can generate 120,000 watts of electricity. Six banks of 24 apparatus 100 (144 apparatus 100) maximizes the collection of wake vortex winds in an airport application. Each group of 144 AWGETS spinning at 200 rpm for one hour would generate 2,592 megawatt hours of electricity.

Apparatus 100 can be constructed to be relatively easily assembled and maintained. Transportation costs are a fraction of the expense of transporting traditional wind turbines. Unlike traditional wind turbines, there is no need for special vehicles, road closures or other costly measures to transport a single apparatus 100. Even multiple apparatus 100 can be transported by traditional trucking, rail or air freight methods. The set-up costs are less than traditional wind turbines and the infrastructure to collect and store the electricity generated by the apparatus 100 can be by known methods.

Harnessing of Aircraft Wind Energy

More particular systems and methods for harnessing man-made wind energy produced by aircraft (fixed wing aircraft or rotorcraft; horizontal or vertical takeoff) are described below. The systems and methods can utilize the particular wind turbine described above and illustrated in FIGS. 1-10. However, the systems and methods more generally can utilize any of a variety of conventional wind turbines to harness aircraft wind energy as described below.

Upon the takeoff and/or landing of an aircraft on a commercial or military aircraft landing surface, substantial wind energy is generated by the aircraft in the vicinity of the landing surface. On a runway (or other horizontal takeoff/landing surface), substantial wind flow in the form of wake vortices is generated during a horizontal takeoff/landing event of the aircraft (in particular fixed wing aircraft). Such wake vortices are traditionally avoided by other incoming or outgoing aircraft. Similarly, on a helipad (or other vertical takeoff/landing surface), substantial wind flow in the form of downwashes are generated during a vertical takeoff/landing event of the aircraft (in particular rotorcraft). The disclosed systems and methods take advantage of these lift by-products from takeoff/landing and use the wind velocity to spin a wind turbine from which electricity is generated from the actual turbine or subsequent turbines driven by the turbine being propelled by the wind.

The harnessing of such winds can be applied generally to any aircraft (e.g., wing or rotorcraft) that generates lift upon takeoff and/or landing. The size, weight, velocity, wingspan/rotor diameter of the aircraft will affect the velocity, size (e.g., spatial extent of significant induced air flows), and duration of the resulting air flow of the generated wind in the vicinity of the landing surface (e.g., a wake vortex traveling laterally outward across and away from the runway area, a downwash traveling vertically downward and then laterally outward across and away from a helipad). With many factors affecting the properties of the induced air flow (e.g., time of day, natural wind currents, weather, etc.), current CFD (Computational Fluid Dynamics) software tools permit studies on various types of commercial and military aircraft. Based on the CFD analysis, a theoretical boundary of a desirable wind capture region (e.g., a spatial region external to the landing surface where induced air velocities are typically high) can be identified with regard to the placement of a wind turbine device to take advantage of and actually harness the wind velocities from flows such as wake vortices and downwashes.

Horizontal Takeoff and Landing

Figures 14, 15:
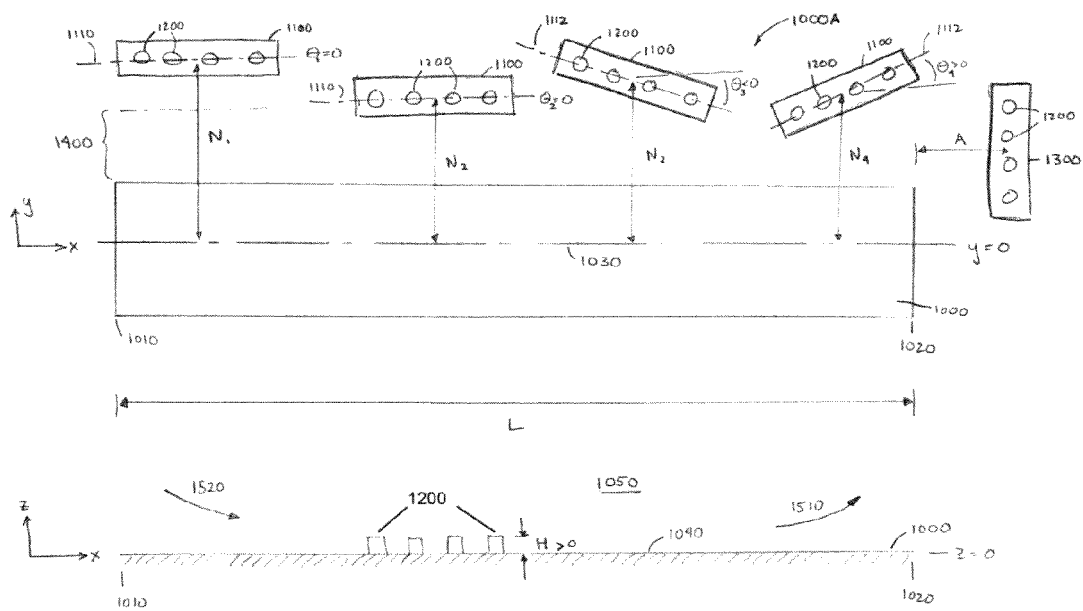
FIG. 14 illustrates a top view (top drawing) and side view (bottom drawing) of a wind power generation system according to an embodiment of the disclosure.
FIG. 15 illustrates a top view (top drawing) and side view (bottom drawing) of a wind power generation system according to an additional embodiment of the disclosure.

FIG. 14 illustrates a wind power generation system 1000A according to the disclosure. The wind power generation system 1000A generally includes an aircraft landing surface 1000, one or more wind capture regions 1100, 1300 external to the landing surface 1000, and one or more wind turbine apparatus 1200 positioned in the wind capture regions 1100, 1300. Upon takeoff 1510 or landing 1520 of an aircraft, wind generated in the external environment 1050 by the takeoff or landing event (e.g., wingtip vortices) travels outward away from the landing surface 1000 and causes the working surfaces (e.g., turbine blades) of the wind turbine apparatus 1200 to rotate and generate power.

As illustrated, the aircraft landing surface 1000 represents a runway or other horizontal landing/takeoff surface (e.g., at a commercial or military airport) having a proximal end 1010 and a distal end 1020. The terms "proximal" and "distal" in this case represent the usual direction of travel of an aircraft that is landing or taking off from the landing surface 1000. Namely, the aircraft generally travels from the proximal end 1010 toward the distal end 1020 of the landing surface 1000 whether it is landing or taking off. The landing surface 1000 is sized and shaped (e.g., generally rectangular) to accommodate the horizontal takeoff or landing of an aircraft such as fixed wing aircraft and/or rotorcraft. The landing surface 1000 has a length L defined by a distance between the proximal end 1010 and the distal end 1020. The length L can have any suitable value appropriate for the intended aircraft, for example ranging from 1,000 ft up to 20,000 ft (e.g., at least 1,000 ft, 2,000 ft, 3,000 ft or 5,000 ft and/or up to 5,000 ft, 10,000 ft, 15,000 ft or 20,000 ft). Similarly, the width of the landing surface 1000 can range from 20 ft up to 300 ft (e.g., at least 20 ft, 40 ft, 70 ft or 100 ft and/or up to 150 ft, 200 ft, 250 ft or 300 ft). The landing surface 1000 is generally straight and defines a landing centerline (or axis; such as a line of symmetry of the surface 1000) 1030 from the proximal end 1010 to the distal end 1020 and represents the typical path of an aircraft landing or taking off from the landing surface 1000. The landing surface 1000 has a generally flat (e.g., planar or substantially planar) shape and defines a reference level elevation 1040 for the relative positioning of other objects in the system 1000A. As illustrated, the reference level elevation 1040 represents ground level with an axial coordinate of z=0. Positive values z>0 are above ground or above reference and reflect the space traveled by the aircraft. Negative values z<0 are below ground or below reference.

The wind capture regions 1100, 1300 generally represent any regions in space (either two- or three-dimensional) that are exposed to wind/air flow upon takeoff or landing of an aircraft on the landing surface 1000. In practice, the wind capture regions 1100, 1300 are suitably selected/positioned so that they tend to be exposed to large wind velocities during a takeoff or landing event (i.e., thereby increasing the resulting power generation). For the illustrated embodiment, the wind capture regions 1100, 1300 are positioned so that they are exposed to relatively high wake/wingtip vortex flows generated by an aircraft in the external environment 1050 upon horizontal takeoff or landing. While the wind capture regions 1100, 1300 can be defined in an abstract sense as locations where it would be desirable to locate a wind turbine apparatus 1200 due to the existence of relatively high wake vortex velocities, the wind capture regions 1100, 1300 can be defined additionally or alternatively as the regions in space where the wind turbine apparatus 1200 is/are located for a particular installation.

The wind capture region 1100 is external to the landing surface 1000 and is laterally positioned at a normal distance N away from the landing centerline 1030. As illustrated, the wind capture region 1100 can have an elongate (e.g., rectangular) shape that defines a longitudinal axis 1110, 1112 of the wind capture region 1100. As more particularly illustrated, system 1000A can include a plurality of wind capture regions 1100, and the wind capture regions 1100 can be positioned uniformly at a single normal distance N or at a plurality of different normal distances N (e.g., $N_i$ such as $N_1$ to $N_4$ as in FIG. 14) away from the landing centerline 1030. In an embodiment, the longitudinal axis 1110 is substantially parallel (e.g., +/−15°, +/−10°, or +/−5° from parallel) to the landing centerline 1030 as shown by wind capture regions 1100 at $N_1$ and $N_2$ in FIG. 14. In another embodiment, the longitudinal axis 1112 is angled (e.g., at least 5°, 10°, or 15° and/or up to 15°, 30°, or 45° from parallel) relative to the landing centerline 1030 as shown by wind capture regions 1100 at $N_3$ and $N_4$ in FIG. 14. The use of multiple normal distances $N_i$ and/or the inclusion of angled wind capture regions 1100 can accommodate the possibility that the spatial location of peak or otherwise desirable wake vortex flows may occur at different lateral positions (i.e., y-coordinate as illustrated) as a function of longitudinal position (i.e., x-coordinate as illustrated) along the landing surface 1000. For example, for wind capture regions 1100 positioned near the proximal end 1010, it can be desirable to have an inwardly angled (i.e., θ<0) wind capture region 1100 and/or successive wind capture regions 1100 that are closer to the landing surface 1000 as they progress from the proximal end 1010 to the distal end 1020 (e.g., $N_1 > N_2$, where the wind capture region 1100 at $N_1$ is closer to the proximal end 1010). Similarly, for wind capture regions 1100 positioned near the distal end 1010, it can be desirable to have an outwardly angled (i.e., θ>0) wind capture region 1100 and/or successive wind capture regions 1100 that are further from the landing surface 1000 as they progress from the proximal end 1010 to the distal end 1020.

The desired value (or range of values) for the normal distance N depends on the types of aircraft that routinely use the landing surface 1000 (i.e., since an induced wake vortex flow will depend on aircraft geometry) as well as any rules/regulations at a given airport facility regarding the placement of objects near the landing surface. A typical airport often defines an object-free zone 1400 adjacent the landing surface 1000 that does not contain any objects above the ground/reference level 1040 defined by the landing surface 1000. In such a case, and the wind capture region 1100 can suitably be located such that the normal distance N ranges from 5 ft to 50 ft beyond the object-free zone 1400. Relative to the landing centerline 1030, the normal distance N suitably can be at least 50 ft, 100 ft, 150 ft, 200 ft, 300 ft, or 400 ft and/or up to 100 ft, 150 ft, 200 ft, 250 ft, 300 ft, 350 ft, 400 ft, or 500 ft. In specific embodiments, the normal distance N can range from 200 ft to 250 ft or 400 ft to 450 ft.

In the illustrated embodiment, the system 1000A includes a plurality of wind capture regions 1100. However, the system 1000A can include a single wind capture region 1100, for example one that extends substantially the entire length L of the landing surface 1000. In another embodiment, the wind capture regions 1100 can extend only a portion of the entire length L of the landing surface 1000, for example at least 5% or 10% and/or up to 10%, 20%, or 30% of the length L. In such a case, there can be a wind capture region 1100 positioned at or near the proximal end 1010 and another wind capture region 1100 positioned at or near the distal end 1020 of the landing surface 1000, the locations where wake vortex flows can be at relatively high magnitudes.

As illustrated, the wind capture regions 1100 suitably are positioned laterally away from the landing surface 1000 and extend in a direction that is parallel or nearly parallel to the landing surface 1000. In an embodiment, the system 1000A can further include one or more second wind capture regions 1300 with wind turbine apparatus 1200 positioned therein external to the landing surface 1000 and longitudinally positioned at an axial distance A away from the proximal end 1010 or the distal end 1020 of the landing surface 1000.

The wind turbine apparatus 1200 is positioned in the wind capture region 1100, 1300 at an elevation H relative to the reference level elevation 1040 of the landing surface 1000. The elevation H generally represents the approximate location of the top and/or the working surface (e.g., turbine blades) of the apparatus 1200. A positive elevation H>0 represents an above-ground or above-reference installation, and a negative elevation H<0 represents a below-ground or below-reference installation. Each wind capture region 1100, 1300 can include a plurality of apparatus 1200, and the plurality of apparatus 1200 can be independently mounted at the same or different values for the elevation H. For an above-reference level configuration (i.e., as illustrated in FIG. 14), the elevation H suitably ranges from 0 ft to 10 ft, for example at least 1 ft, 2 ft, or 3 ft and/or up to 5 ft, 8 ft, or 10 ft. In many commercial and military airports, objects in the vicinity of the landing surface 1000 should be less than about 8 ft in height, even if located outside of the object-free zone 1400.

In another embodiment, the elevation H can range from less than 0 ft to −10 ft, thus representing a sunken elevation relative to the ground/reference level 1040. For example, the elevation H can be at least 5 ft, 8 ft, or 10 ft below reference and/or up to 1 ft, 2 ft, or 3 ft below reference. In this below-reference embodiment, the apparatus 1200 can be mounted in a below-reference/below-ground channel or trough (e.g., surrounded by earth or other material on either side of the channel at reference/ground level; running parallel or angled relative to the landing surface 1000 in a manner similar to the wind capture regions 1100 such that the wind capture region 1100 physically represents the cannel or trough). The channel can be configured to capture and funnel wake vortices through the apparatus 1200 in the channel. Such an embodiment can further include, for example, grates or covers over the channel, an apparatus 1200 with a helical blade on a horizontal axis running parallel to the landing surface, and/or a hood-type structure that deflects wake vortex flows into vertical or horizontal axis apparatus 1200 in the channel.

In another embodiment, the wind turbine apparatus 1200 is adjustably positioned/mounted in the wind capture region 1100 so that the elevation H of the apparatus 1200 is adjustably selectable. For example, the apparatus 1200 can be mounted on a vertically movable elevator or shaft. Such a configuration can allow the apparatus 1200 to assume different above-reference elevations to be optimally moved/located for a specific aircraft and a specific landing event. The configuration additionally can allow the apparatus 1200 to assume different above- and/or below-reference elevations similarly to optimally locate the apparatus for a specific aircraft/landing event and/or to be out of the way when not in use.

Vertical Takeoff and Landing

FIG. 15 illustrates another wind power generation system 2000A according to the disclosure. The wind power generation system 2000A generally includes an aircraft landing surface 2000, one or more wind capture regions 2100 positioned outwardly/radially away from the center of the landing surface 2000, and one or more wind turbine apparatus 2200 positioned in the wind capture regions 2100. Upon takeoff 2510 or landing 2520 of an aircraft, wind generated in the external environment 2050 by the takeoff or landing event (e.g., downwash air flows) travels downward and outwardly away from the center of the landing surface 2000 and through the wind capture region 2100, thus causing the working surfaces (e.g., turbine blades) of the wind turbine apparatus 2200 to rotate and generate power.

As illustrated, the aircraft landing surface 2000 represents a helipad or other vertical landing/takeoff surface (e.g., at a commercial or military airport). The landing surface 2000 generally includes a central landing surface 2010 that defines a landing center point 2040 (e.g., the geometric center thereof) of the aircraft landing surface 2000. The central landing surface 2010 represents the location where an aircraft will land. The landing surface 2000 further includes a peripheral landing surface 2020 positioned around the central landing surface 2010 and defining a plurality of openings 2030 thereon. The openings 2030 can have any desired shape and represent a mesh, grates, etc. that permit air to flow therethrough from the external environment 2050 to the space below the peripheral landing surface 2020. Suitably, the relative open surface area of the peripheral landing surface 2020 form the openings 2030 should be large enough to permit sufficient air throughflow in the form of the aircraft downwash, but should be small enough to provide sufficient structural integrity to the peripheral landing surface 2020 (e.g., so that passengers and/or vehicles can access a landed aircraft via the peripheral landing surface 2020, which should be thick enough and formed of an appropriate material to provide such structural integrity). The central landing surface 2010 is sized and shaped to accommodate the vertical takeoff or landing of an aircraft such as winged aircraft and/or rotorcraft. As illustrated, the central landing surface 2010 and the peripheral landing surface 2020 have a generally circular shape, but they can independently have any desired shape such as a generally square, rectangular, oval, or other shape. The peripheral landing surface 2020 extends to radial positions (or other characteristic half-dimensions such as half-width or half-length of a square/rectangle) up to 100 ft, for example at least 5 ft, 8 ft, 10 ft, 15 ft, 20 ft or 30 ft and/or up to 20 ft, 30 ft, 50 ft, 70 ft, or 100 ft, with similar lengths also being suitable for the length/radial extent of the wind capture regions 2100. The lower/inner extent of the peripheral landing surface 2020 similarly defines the size of the central landing surface 2010 (e.g., having a diameter of 5 ft, 8 ft, or 10 ft to about 15 ft, 20 ft or 30 ft). The central landing surface 2010 has a generally flat (e.g., planar or substantially planar) shape and defines a reference level elevation 2050 for the relative positioning of other objects in the system 2000A. As illustrated, the reference level elevation 2050 represents ground level with an axial coordinate of z=0. Positive values $z>0$ above ground or above reference and reflect the space traveled by the aircraft. Negative values $z<0$ are below ground or below reference.

The wind capture region 2100 is radially positioned at a radial distance R away from the landing center point 2040 and vertically positioned at a location below the reference level elevation 2050. Alternatively, the position of the wind capture region 2100 can be expressed as spanning a range of radial distances R (e.g., spanning $R_1$ to $R_2$ generally corresponding to the peripheral landing surface 2020 as illustrated). The wind capture region 2100 is in fluid communication with the external environment 2060 via the plurality of openings 2030. The wind capture region 2100 generally represents any region in space (either two- or three-dimensional) that is exposed to wind/air flow upon takeoff or landing of an aircraft on the landing surface 2000. In practice, the wind capture region 2100 is suitably selected/positioned so that it tends to be exposed to large wind velocities during a takeoff or landing event (i.e., thereby increasing the resulting power generation). For the illustrated embodiment, the wind capture region 2100 is positioned so that it is exposed via the openings 2030 to relatively high downwash air flows generated by an aircraft in the external environment 2060 upon vertical takeoff or landing. While the wind capture region 2100 can be defined in an abstract sense as a location where it would be desirable to locate a wind turbine apparatus 2200 due to the existence of relatively high downwash velocities, the wind capture region 2100 can be defined additionally or alternatively as the region or regions in space where the wind turbine apparatus 2200 is/are located for a particular installation.

FIG. 15 illustrates an embodiment with a single wind capture region 2100. In practice, the system 2000A suitably includes a plurality of wind capture regions 2100 at a plurality of tangential positions θ around the landing center point 2040 (e.g., distributed around a portion of the peripheral landing surface 2020 or around the entire peripheral landing surface 2020). Alternatively, the wind capture region 2100 can simply represent the entire area under the peripheral landing surface 2020 and fluid communication between the wind capture region 2100 and the environment 2060 is allowed at discrete locations defined by the openings 2030.

The wind turbine apparatus 2200 is positioned in the wind capture region 2100 at an elevation H below the reference level elevation 2050 of the central landing surface 2010. The elevation H generally represents the approximate location of the top and/or the working surface (e.g., turbine blades) of the apparatus 2200. Each wind capture region 2100 can include a plurality of apparatus 2200, and the plurality of apparatus 2200 can be independently mounted at the same or different values for the elevation H. The elevation H suitably ranges from less than 0 ft to −10 ft, thus representing a sunken elevation relative to the ground/reference level 2050. For example, the elevation H can be at least 5 ft, 8 ft, or 10 ft below reference and/or up to 1 ft, 2 ft, or 3 ft below reference. The wind capture region 2100 generally has a depth that accommodates the net height of the apparatus 2200. For example, the wind capture region 2100 may have a depth of 10 ft such that an apparatus 2200 having a height of 8 ft results in an elevation H of −2 ft.

In another embodiment, the peripheral landing surface 2020 can essentially be an object-free zone that has a substantially solid surface and deflects downwash air flows radially outward (e.g., there are no or a limited number of openings 2030). In this case, a plurality of apparatus 2200 can be circumferentially positioned around all or a portion of the peripheral landing surface 2020 (e.g., at a distance up to 50 ft beyond the peripheral landing surface 2020, such as at least 1 ft, 2 ft, or 5 ft and/or up to 10 ft, 20 ft, or 50 ft) to harness the outward radial air flows in a manner similar to the embodiment illustrated in FIG. 14 (albeit for a generally axisymmetric geometry instead of a generally rectangular geometry). In this case, the wind capture region 2100 could be an annular (or other shape) region that surrounds all or a portion of the peripheral landing surface 2020 and contains the apparatus 2200.

Related Methods, Aircraft, and Turbines

The power generation systems 1000A, 2000A illustrated in FIGS. 14 and 15 can be used in methods of generating electricity/power. In general, the wind turbine apparatus 1200, 2200 of the system 1000A, 2000A is exposed to wind generated by an aircraft upon takeoff, landing, or both from the landing surface 1000, 2100, for example horizontal takeoff 1510/landing 1520 or a vertical takeoff 2510/landing 2520. The generated wind rotates the working surface of the apparatus 1100, 2100, which rotation can generate electricity directly or be used to rotate other turbines for electricity generation. Generated electricity can then be collected in a collection means, for example including a battery for storing/distributing generated electricity, a sub-station (e.g., for grid tie-in), and/or a utility station (e.g., for maintenance). Once collected, the generated electricity can be delivered to a desired location by a delivery means, for example including power lines for delivery to a power grid in general or the airport in particular.

The specific types of aircraft suitable for the disclosed methods are not particularly limited and generally include fixed-wing aircraft (e.g., jet or propeller) and rotorcraft of various sizes, whether intended for commercial or military use. Larger sized aircraft generally create larger velocity wakes, making them particularly suitable for economical energy generation. However, smaller aircraft still can provide wakes with sufficient velocity and substantial energy, in particular when the frequency of landing/takeoff events for a given landing surface is relatively high. Examples of suitable commercial fixed wing aircraft include light transports (twin-turboprop) and regional jet airliners (e.g., Antonov An-28, ATR 42, ATR 72, BAe ATP, BAe Jetstream 31, Beechcraft 1900, CASA CN-235, Cessna 208, Bombardier Dash 8, Dornier Do 228, Dornier 328, Embraer EMB 120 Brasilia, Saab 340, Short 360) as well as jumbo jets (e.g., Airbus 330, Airbus 340, Airbus 380, Boeing 314, Boeing 377, Boeing 747, Boeing 767, Boeing 777, McDonnell Douglas DC-10) Examples of suitable military fixed wing aircraft include fighter jets (any of the various types), bombers (e.g., Boeing B-29, Boeing B-52), and transports (e.g., Boeing C-17, Boeing E-6). Examples of suitable rotorcraft (commercial and military) include the Bell 206 (a commonly used medium sized helicopter), the H-65 Dolphin (used by the U.S. Coastguard), the UH-1 Huey (used extensively in military operations), the Sikorsky S-76 (used by police and ambulance services), and the CH-47 Chinook (a large military transport helicopter).

The specific types of wind turbine apparatus suitable for the disclosed systems and methods also are particularly limited and generally include horizontal and vertical axis configurations that can be mono-, multi-, or omni-directional. Within the vertical axis configuration, there are three general sub-types: Darrieus, Giromill, and Savonius wind turbines. The wind turbine apparatus suitably range from 5 ft to 8 ft tall and can have a blade configuration ranging from 2 ft or more in diameter. Examples of suitable commercial suppliers of various horizontal and vertical axis turbine apparatus include: WindMax Green Energy, ARI Renewable Energy Co., Home Energy, Eoltec, Fortis Windenergy, Tulipo, Prowin, Zephyr, Proven Energy, Windsave, The Windfactory, Renewable Devices, Enflo, Southwest Windpower, Quietrevolution, Superwind, Windside, Turby, Iskrawind, Windkraft, Marlec Engineering Co. Ltd, Ampair Microwind, Aerocraft, Aerogen, Aerocatcher, Mariah Power, O'Connor Wind Energy, FlexiEnergy, Mag Wind, Jetstream, Helix Wind, Zhejiang Liten Wind Power Co., Eclectic Energy Limited, Prostar International Electric Co., Ltd., TAOS Wind Energy, Conergy, Four Seasons Windpower, Samrey Generators & Turbines Ltd, Electrovent, Windmission, Vaigunth Ener Tek (P) Ltd, Bornay, Windterra, Green Energy Technologies, Spiralwindllc, Enviro Energies, Qingdao EL Wind Power Generator Co. Ltd., Sphericalwindpower, Windtronics, Inc., Urban Green Energy, Wind Machine Pty Ltd, Alternate Technology Resource, SUN ECO Solar & Wind Power, Building Turbines LLC, and Aerofortis.

EXAMPLES

The following examples illustrate method of constructing a wind power generation system according to the various disclosed embodiments. The method generally includes: (a) identifying an aircraft landing surface (e.g., a runway or helipad as illustrated in FIGS. 14 and 15) and its surrounding environment; (b) identifying one or more types of aircraft that take off and/or land on the aircraft landing surface; (c) identifying any spatial constraints for the placement of a wind turbine apparatus in relation to the aircraft landing surface; (d) determining wind flow patterns (e.g., mean velocity and/or pressure fields which can be steady or transient) around the aircraft landing surface and in the surrounding environment that are generated upon takeoff or landing of the aircraft on the aircraft landing surface; (e) identifying a placement location (e.g., one or more wind capture regions) for the wind turbine apparatus based on the determined wind flow patterns and any identified spatial constraints; and (f) installing the wind turbine apparatus in the identified placement location. The method can be repeated for multiple aircraft designs (i.e., each of which can generate distinct air flow patterns), and the result of the method can include the identification of multiple placement locations (i.e., which separately take advantage of the distinct air flow patterns experienced at a particular landing surface for different aircraft) and/or the identification of a single placement location that represents an average or optimum placement to account for multiple distinct air flow patterns.

As described above, airports can impose restrictions on the height and/or proximity of an object that is installed in the vicinity of an aircraft landing surface. Thus, the spatial constraints can include a maximum elevation H, a minimum elevation H, or both relative to a reference level elevation for an installed object. Alternatively or additionally, the spatial constraints can include a maximum distance D, a minimum distance D, or both relative to a spatial reference defined by the aircraft landing surface. (e.g., a centerline of a runway or a center point of a helipad). In many airports, installed objects are restricted to a maximum elevation H and a minimum distance D.

The particular process of determining wind flow patterns around the aircraft landing surface and in the surrounding environment that are generated upon takeoff or landing of the aircraft is not particularly limited. The wind flow patterns can generally be determined/estimated either computationally or experimentally, for example using CFD software, empirical anemometric measurement, or both. The following examples illustrate the use of CFD.

Once the wind flow patterns generated by a takeoff or landing event are determined, the identification of the placement location can be based on any suitable criteria (i.e., in addition to any spatial constraints that may exist for the given airport/landing surface). For example, the placement location can be a spatial location that experiences a local maximum air velocity transient for a takeoff or landing event of the aircraft. Alternatively or additionally, the placement location can be a spatial location that maximizes the power generated by the wind turbine apparatus (or a plurality thereof) for a takeoff or landing event. The generated power is generally proportional to the velocity cubed, so relative power generation can be computed directly from a determined velocity field/wind flow pattern. Absolute power generation also can be estimated for a given turbine apparatus using known correlations with the velocity field.

The following Examples 1 and 2 represent a CFD analysis of various fixed wing aircraft and rotorcraft. For a given aircraft geometry and weight, transient or steady velocity fields were computed and the resulting velocity profiles were used to estimate the power and power density of wind turbines placed in various locations within the velocity fields. A commercial CFD software package ANSYS CFX (available from ANSYS Inc., Canonsburg, Pa.) was used to perform the analysis. A Baseline Reynolds Stress Model (RSM; a standard $2^{nd}$-order model using $\omega$ to model turbulent dissipation) was used to model the computed turbulent flows and was found to reasonably fit available confirmation data.

Example 1

Horizontal Takeoff and Landing of Fixed Wing Aircraft

FIGS. 16-19 represent the results for the CFD analysis of the takeoff of several commercial jets: Airbus A380, Airbus A330-300, Boeing 777-300, Boeing 747-400, McDonnel Douglass DC-10, and a U.S. Military C17 transport. The takeoff was modeled using a 2D domain (y-z plane) perpendicular to the direction of travel of the aircraft as the aircraft passed through the modeled domain. The initial conditions for the simulation were taken from Proctor et al., "Wake vortex transport and decay in ground effect: vortex linking with the ground," $35^{th}$ Aerospace Sciences Meeting, AIAA 2000-0757 (2000). The resulting simulation represented the transient wing tip/wake vortices generated in the modeled domain.

Figure 16A:
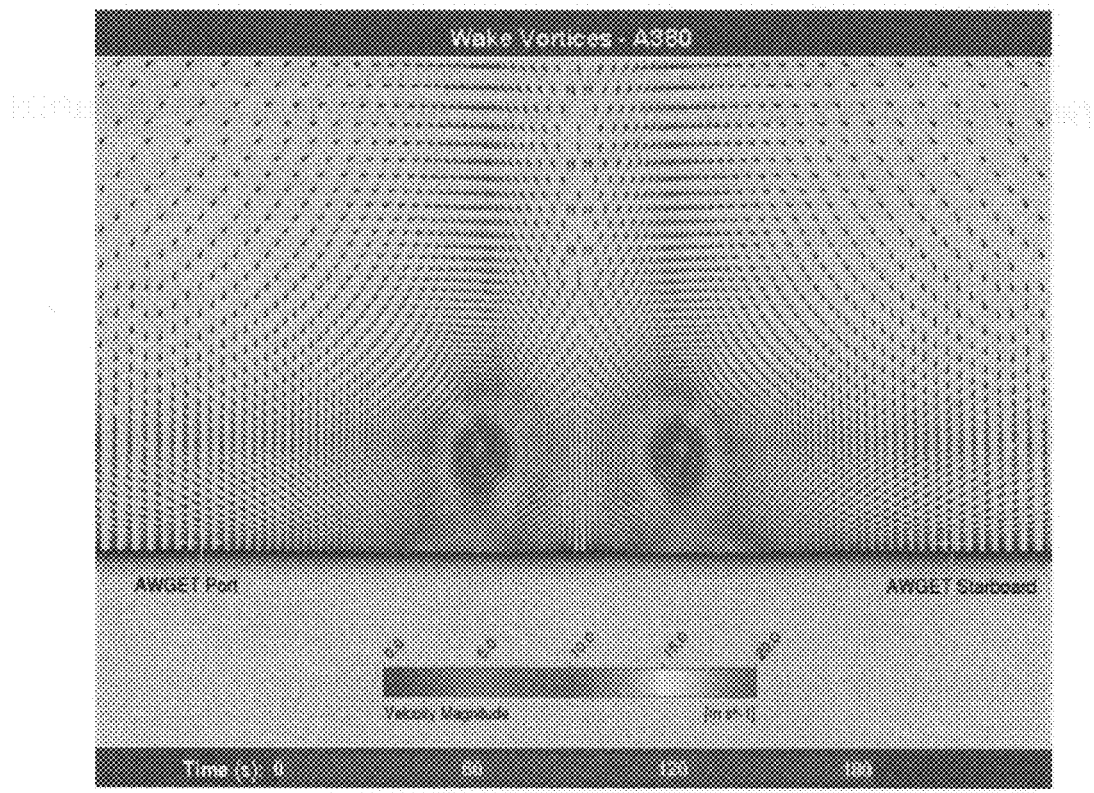
FIGS. 16A-16D illustrate transient velocity vectors (y-z plane) associated with the wing tip vortices of an Airbus A380 jet upon takeoff (t is approximately 0+, 5, 10, and 15 sec for FIGS. 16A-16D, respectively).
Figure 16B:
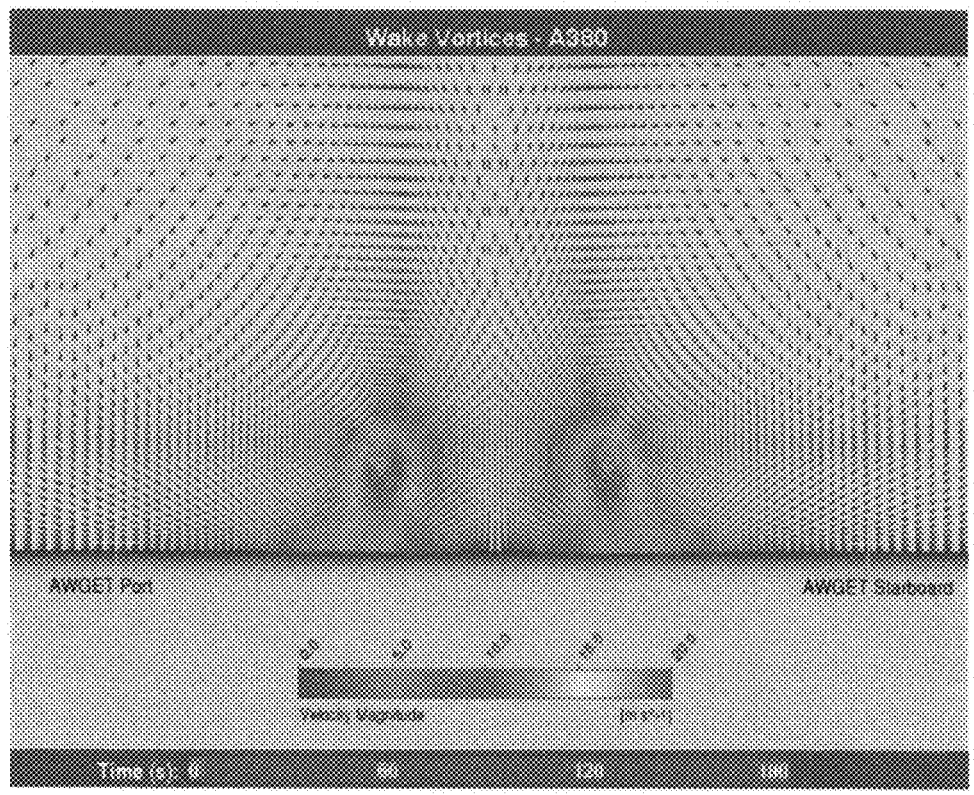
Figure 16C:
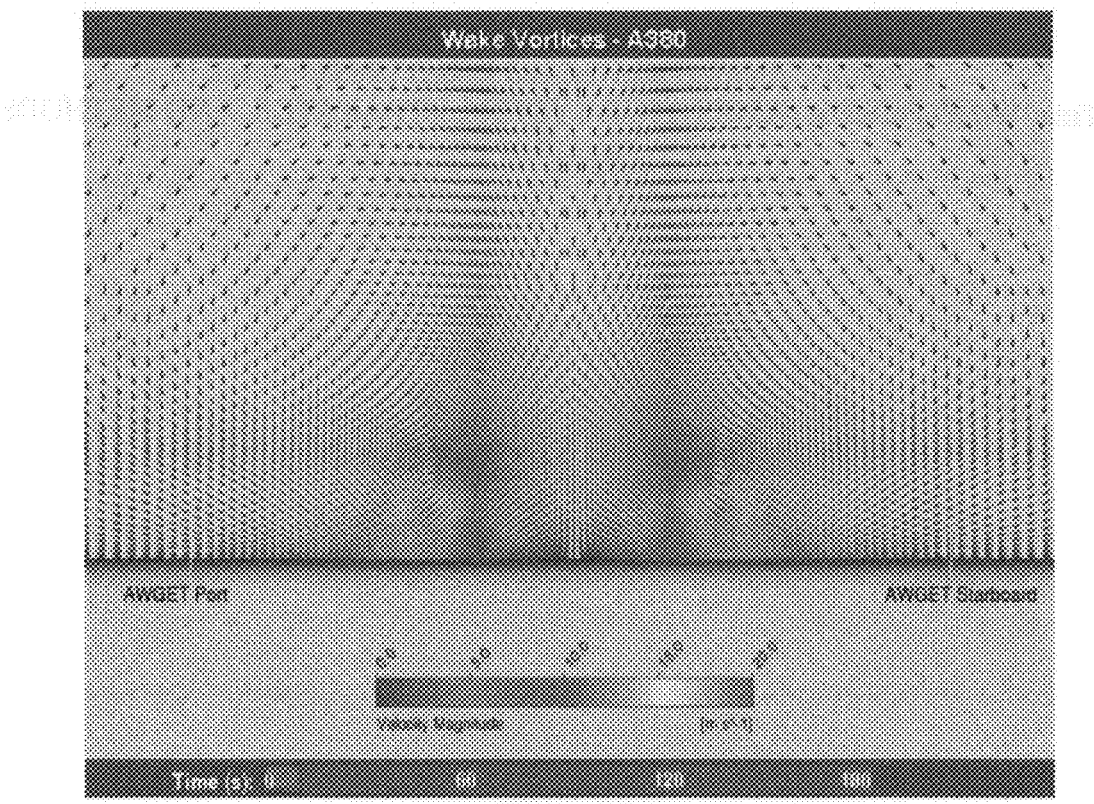
Figure 16D:
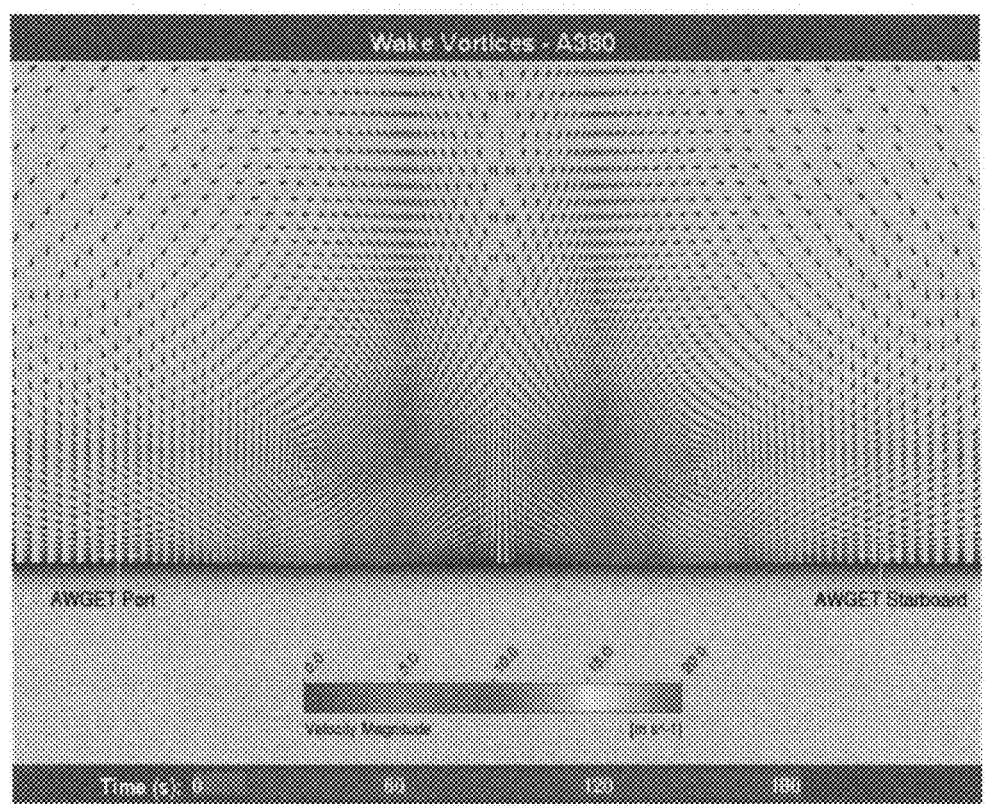

FIGS. 16A-16D illustrate transient velocity vectors (y-z plane) associated with the wing tip vortices of an Airbus A380 jet upon takeoff. FIG. 16A represents the point in time (t=0+) when the aircraft passes through the modeled 2D domain. FIGS. 16B-16D represent the transient development of the wake vortices at approximately 5, 10, and 15 sec, respectively, after the aircraft passes through the modeled 2D domain. In the figures, the yellow lines represent positions 405 ft away from the runway centerline (represented by line of symmetry in the plots). The plots illustrate that the position of the wake vortex (e.g., as represented by its center of rotation) varies in both space and time. Initially, the wake vortex has a relatively high axial position that gradually decreases, achieves a local minimum at about t=10 sec, and then starts to increase as it moves laterally outward. From this result, it was determined that a suitable placement of a wind turbine would be about 200 ft from the runway centerline. At this position, the wake vortex was relatively close to the ground, meaning that the velocity of the generated air flows in the vicinity of the ground was relatively high and could be more effectively utilized to drive ground-based turbines. When a placement location was closer or further than about 200 ft, the wake vortex was located further from the ground and the air speed in the vicinity of the ground was lower, resulting in less potential power generation. This result was counter-intuitive insofar as it was expected that velocities available to drive a turbine would increase as distance from the runway decreased. While higher velocities were observed closer to the runway centerline (see FIG. 16A), the higher altitude of the wake vortex when closer to the runway meant that less sustained (i.e., long duration), high velocity air flows were present in the vicinity of the ground (i.e., which would be available to drive a wind turbine).

Figure 17:
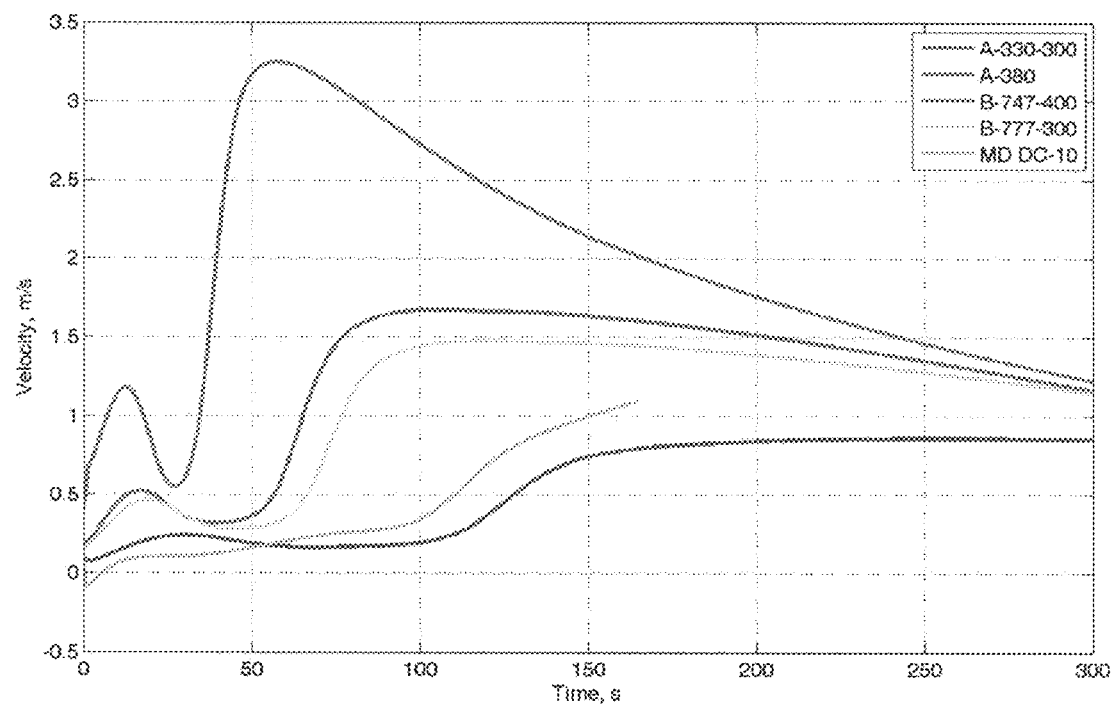
FIG. 17 illustrates transient velocity profiles induced by the takeoff of various commercial jets at a position 405 ft away from the runway and at a height of 1 m.

FIGS. 17-19 represent further CFD results for different aircraft in the form of transient velocity, power density, and power profiles at a fixed lateral position away from the runway centerline and at fixed height above ground.

Figure 18A:
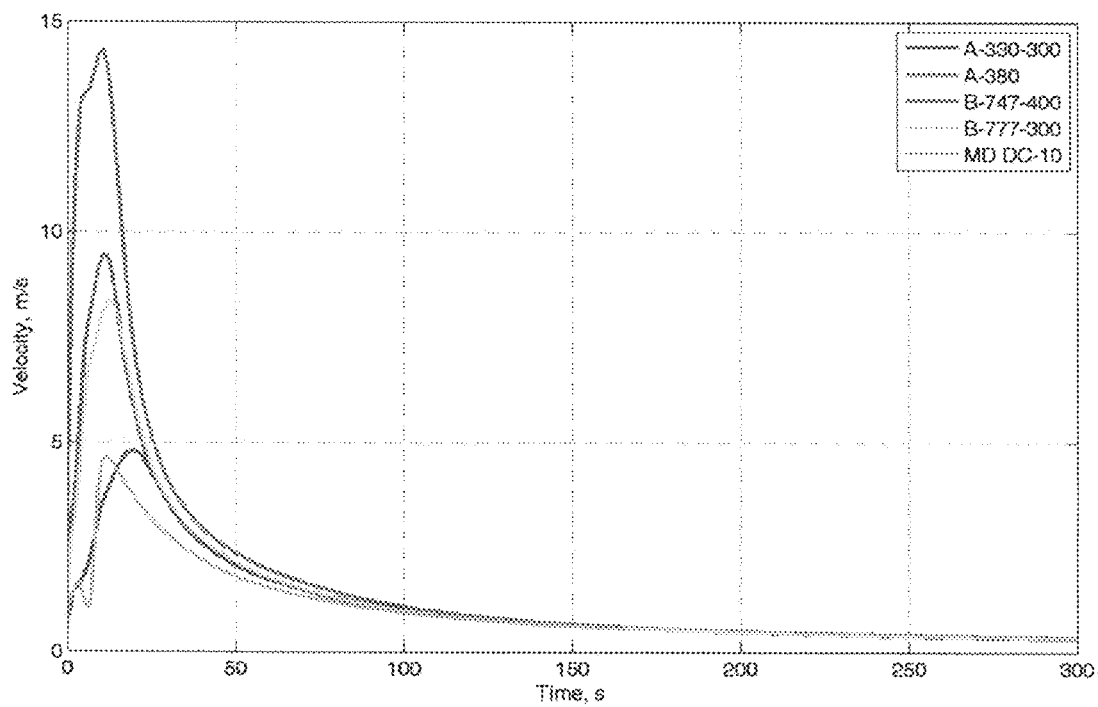
FIGS. 18A-18C illustrate transient velocity, power density, and power profiles, respectively, induced by the takeoff of various commercial jets at a position 200 ft away from the runway and at a height of 1 m.
Figure 18B:
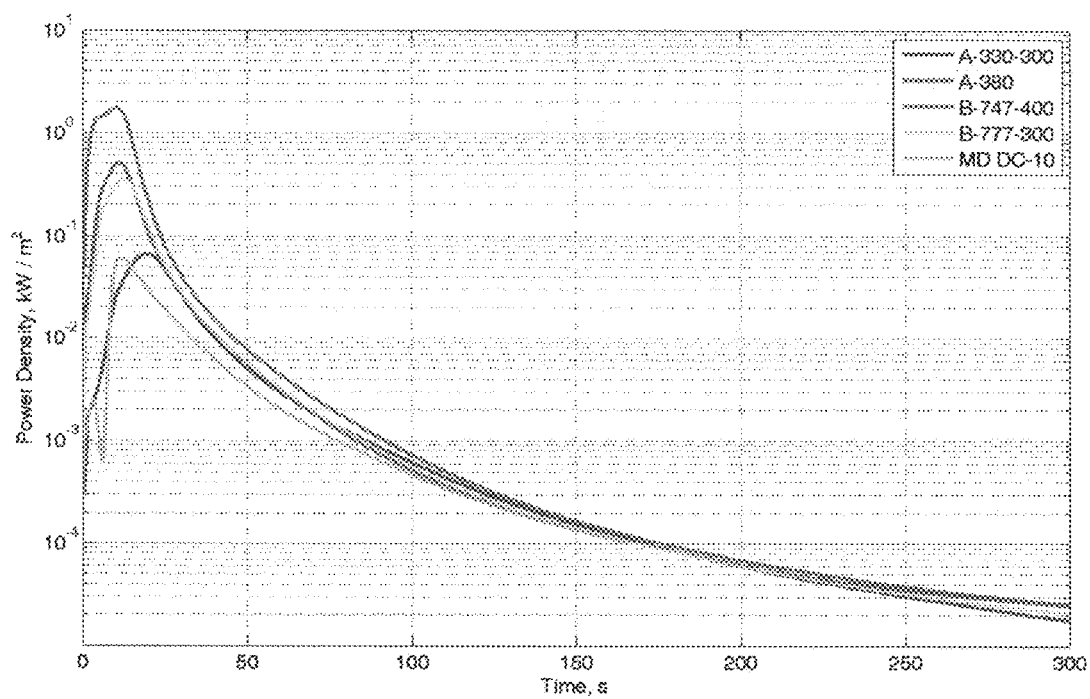
Figure 18C:
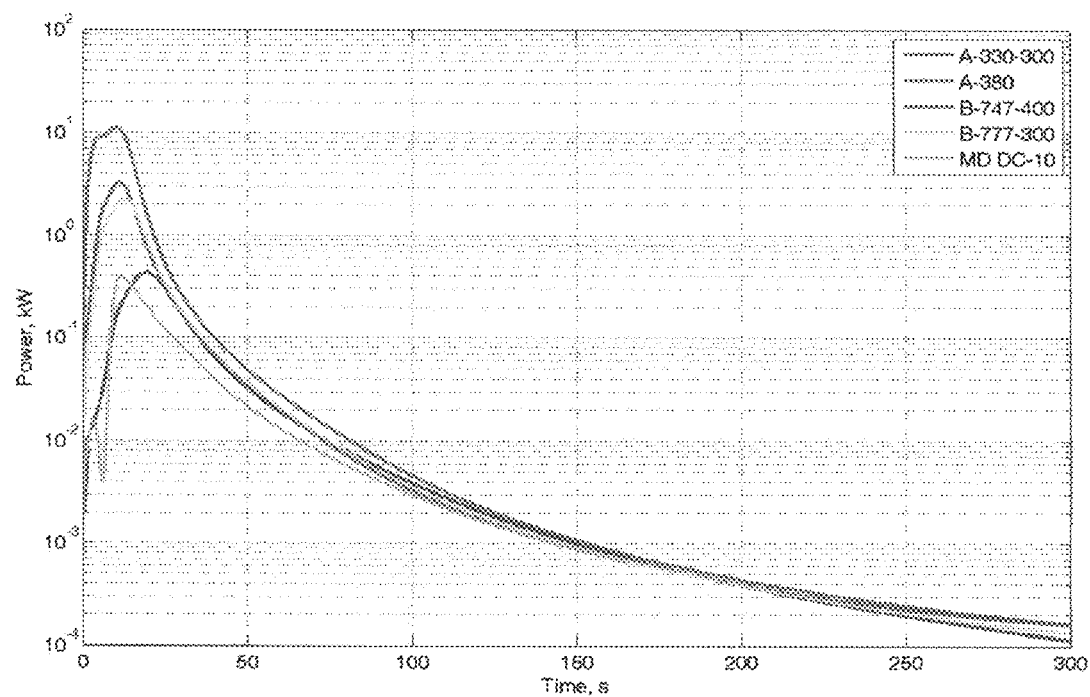

Specifically, FIG. 17 illustrates transient velocity profiles induced by the takeoff of various commercial jets (Airbus A380, Airbus A330-300, Boeing 777-300, Boeing 747-400, and McDonnel Douglass DC-10) at a position 405 ft away from the runway and at a height of 1 m. FIGS. 18A-18C illustrate transient velocity, power density, and power profiles, respectively, induced by the takeoff of various commercial jets (Airbus A380, Airbus A330-300, Boeing 777-300, Boeing 747-400, and McDonnel Douglass DC-10) at a position 200 ft away from the runway and at a height of 1 m. The computed velocities and power densities (which is proportional to the velocity cubed) illustrated that much more favorable output could be obtained at 200 ft as compared to 405 ft. The values for power generated were estimated assuming a frontal area of 1 $m^2$ and an efficiency of 35% for a bank of 24 turbine apparatus. At a placement location of 200 ft, the power peaks at about 10 kW and has a 1-minute average power of about 1 kW. Computed powers were substantially lower at 405 ft.

Figure 19A:
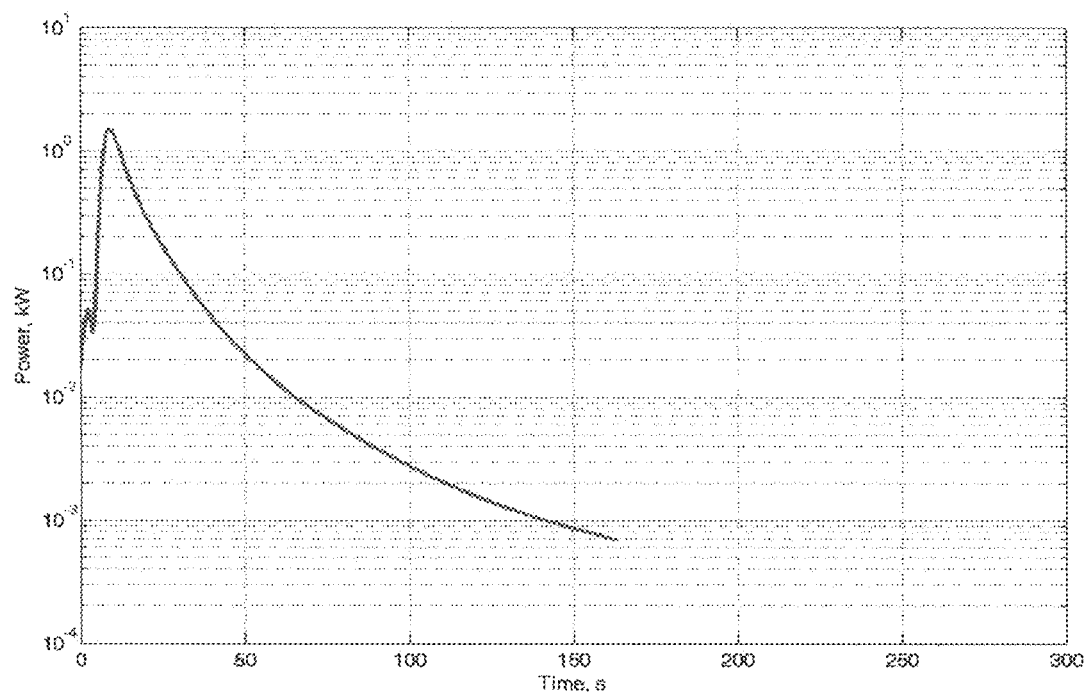
FIGS. 19A-19B illustrate transient power profiles induced by the takeoff of a C17 military transport at positions of 200 ft (19A) and 60 ft (19B) away from the runway and at a height of 1 m.
Figure 19B:
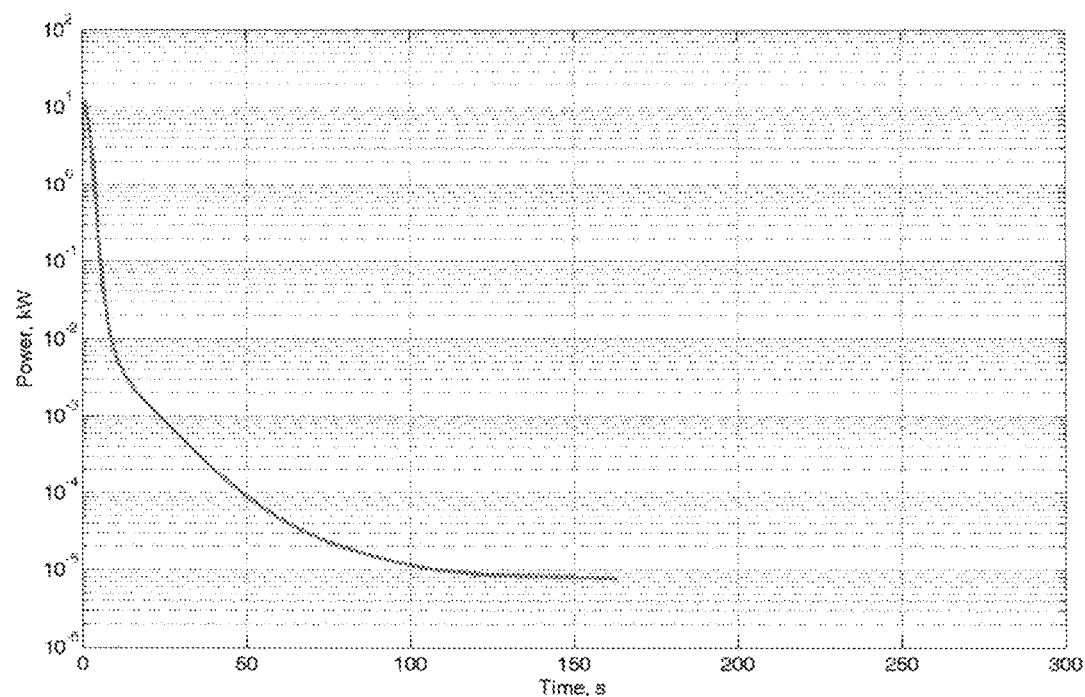

FIGS. 19A-19B illustrate transient power profiles induced by the takeoff of a C17 military transport at positions of 200 ft (19A) and 60 ft (19B) away from the runway and at a height of 1 m. The results show that the power available is approximately the same as for the medium sized civil aircraft shown in FIGS. 17-18 at a placement of 200 ft. This is likely due to the fact that the C17 is approximately the same weight as an A330. Although the C17 has a shorter wingspan (which tends to increase the strength of the starting vortex), the take-off speed is significantly lower (which tends to reduce vortex strength). The results further illustrate that placing the turbine too close to the runway (FIG. 19B at 60 ft) may have a negative impact on performance, as the accelerations are so high that it would be difficult for the turbine to respond. In addition, the power drops off rapidly once the starting vortex has passed through.

Example 2

Vertical Takeoff and Landing of Rotorcraft

FIGS. 20-23 represent the results for the CFD analysis of several hovering commercial and military rotorcraft: Bell 206, H-65 Dolphin, UH-1 Huey, Sikorsky S-76, and CH-47 Chinook. The hovering helicopter was modeled using a 2D axisymmetric domain (r-z plane). The resulting simulation represented the steady downwash air flow generated in the modeled domain.

Figure 20:
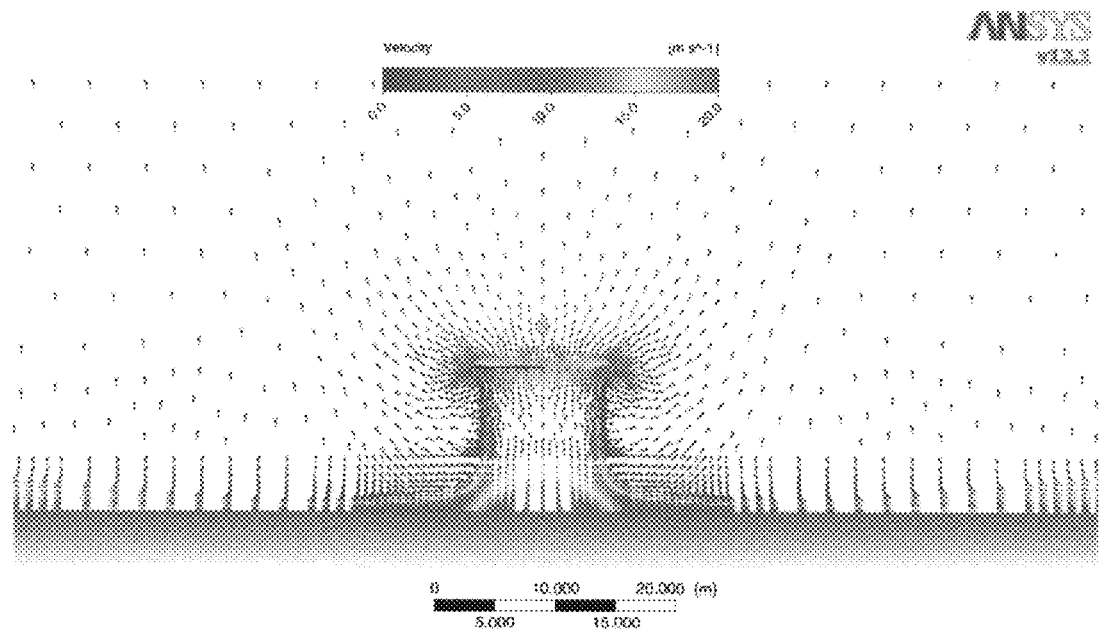
FIG. 20 illustrates steady velocity vectors (r-z plane) associated with the downwash air flow of a hovering H-65 Dolphin helicopter.
Figure 21A:
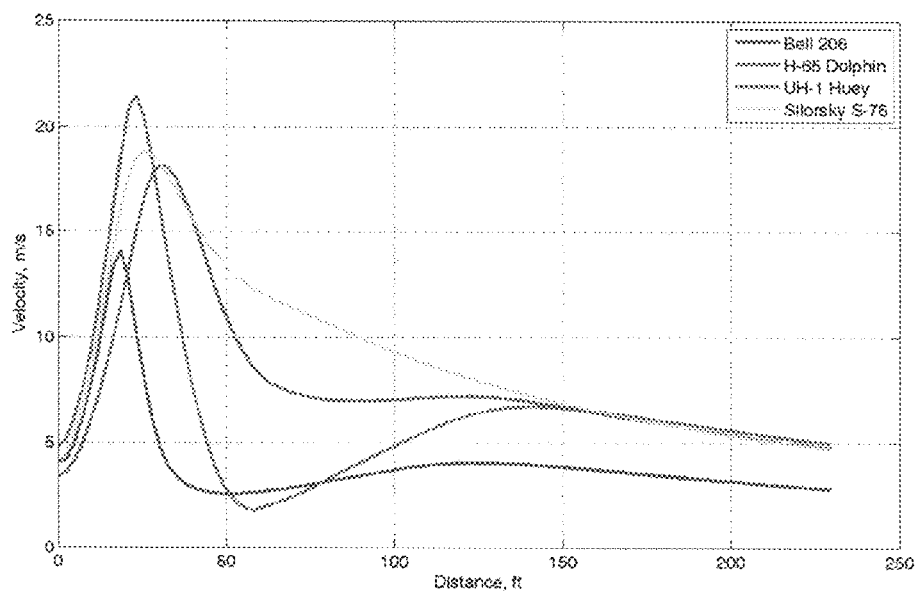
FIGS. 21A-21C illustrate radius-dependent steady velocity, power density, and power profiles, respectively, induced by the hovering of various commercial and military helicopters at a height of 1 m.
Figure 21B:
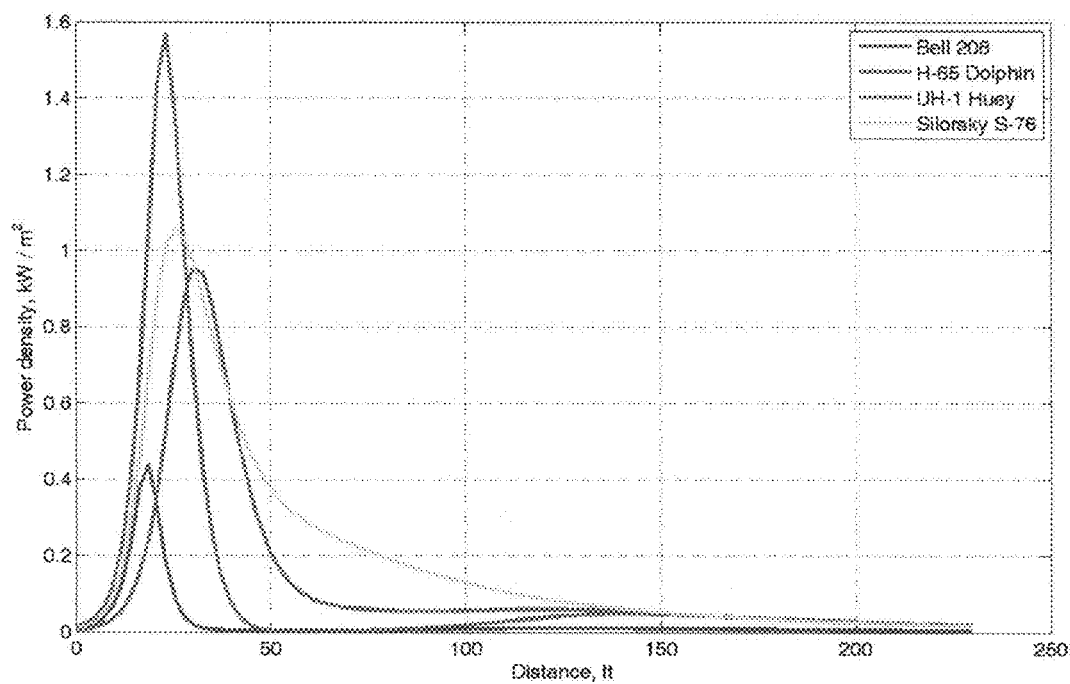
Figure 21C:
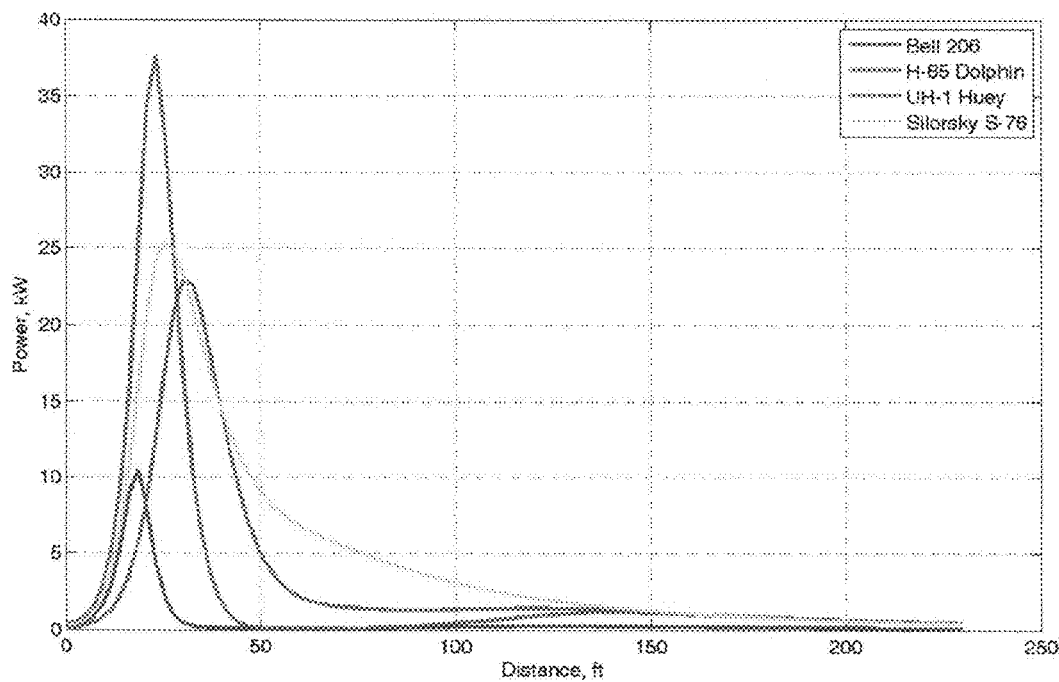
Figure 22:
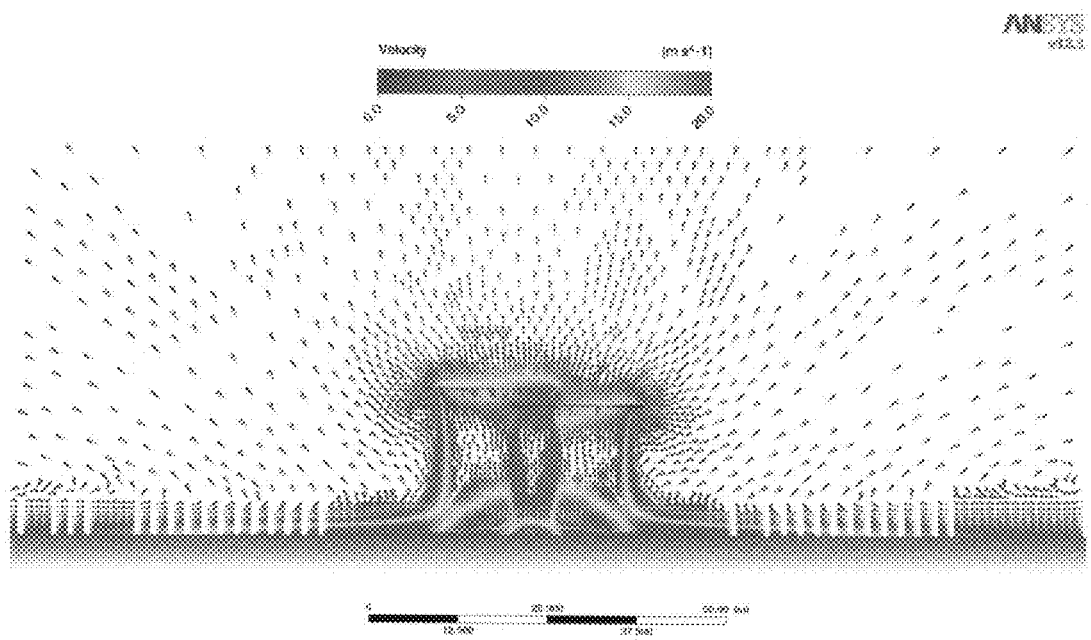
FIG. 22 illustrates steady velocity vectors (r-z plane) associated with the downwash air flow of a hovering CH-47 Chinook helicopter.
Figure 23A:
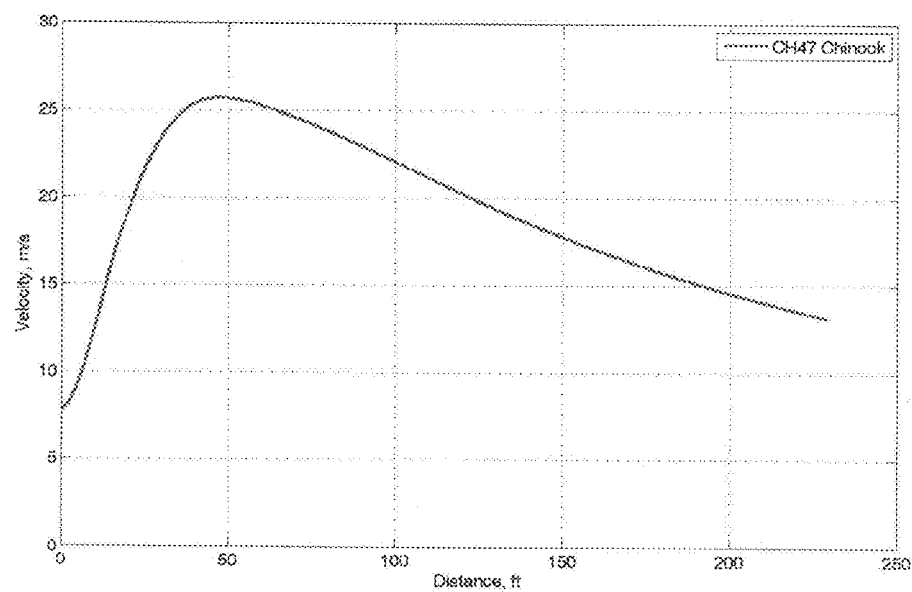
FIGS. 23A-23B illustrate radius-dependent steady velocity and power profiles, respectively, induced by the hovering of a CH-47 Chinook helicopter at a height of 1 m.
Figure 23B:
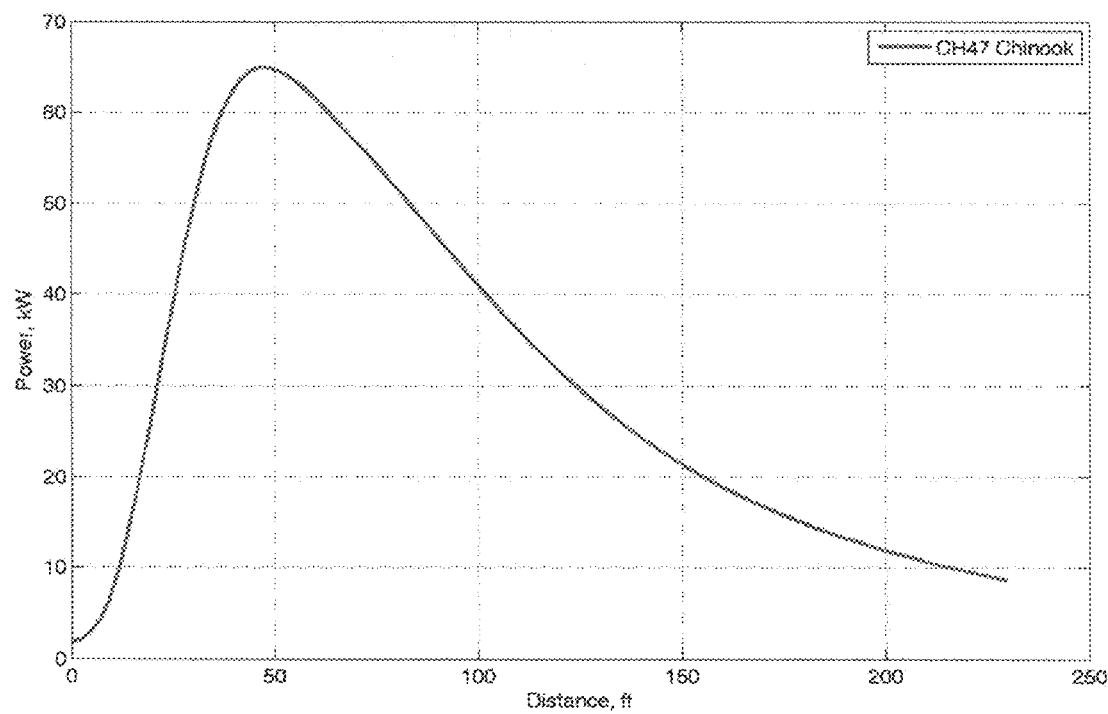

In particular, FIG. 20 illustrates steady velocity vectors (r-z plane) associated with the downwash air flow of a hovering H-65 Dolphin helicopter (single rotor). From the plot, it is seen that the downwash generated by the rotors of the hovering helicopter impacts the ground and then spreads radially outward. FIGS. 21A-21C illustrate radial-dependent steady velocity, power density, and power profiles, respectively, induced by the hovering of various commercial and military helicopters (Bell 206, H-65 Dolphin, UH-1 Huey, and Sikorsky S-76) at a height of 1 m. FIG. 22 illustrates steady velocity vectors (r-z plane) associated with the downwash air flow of a hovering CH-47 Chinook helicopter at a height of 1 m. FIGS. 23A-23B illustrate radial-dependent steady velocity and power profiles, respectively, induced by the hovering of a CH-47 Chinook helicopter (dual rotor). As before, the power was estimated assuming a frontal area of 1 $m^2$ and an efficiency of 35% for a bank of 24 turbine apparatus positioned at a height of 1 m above ground.

While the present disclosure is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

Throughout the specification, where the processes or apparatus are described as including components, steps, or materials, it is contemplated that the processes or apparatus can also comprise, consist essentially of, or consist of, any combination of the recited components, steps, or materials, unless described otherwise. Further, numerical values and ranges can represent substantially the exact values disclosed or an approximation of the disclosed values.

We claim:

1. A wind generator turbine apparatus comprising:
   (a) a base for supporting the apparatus;
   (b) a base mount mounted on the base;
   (c) a permanent magnet generator (PMG) seated on the base mount, the permanent magnet generator comprising an aligned shaft extending along an elongated axis defined by the shaft and adapted to generate electricity when caused to spin circularly;
   (d) a wind turbine comprising:
      i. a housing mounted over and around the shaft of the PMG about the axis having a first end and a second end;
      ii. a plurality of blades (1) circumferentially arranged about the axis defined by the shaft of the housing, (2) extending along with the axis of the shaft, and (3) mounted between a first and a second linkage member, wherein the first linkage member is mounted on the first end of the housing and the second linkage member is mounted on the second end of the housing;
      iii. a linkage cap mounted on the first linkage member and the first end of the housing, wherein the shaft is caused to spin about the axis when wind force is applied to the blades to generate electricity.

2. A system for generating electricity in the presence of man made wind comprising:
   (a) an environment that is exposed to man made wind;
   (b) the apparatus of claim 1 positioned in the environment to allow the wind to apply force to the blades;
   (c) collection means for collecting the electricity generated by the apparatus when a force created by the wind causes the blades to turn;
   (d) delivery means for delivering the electricity from the collection means to desired locations.

3. A method for generating electricity from wind comprising the steps of:
   (a) providing at least one apparatus of claim 1; and
   (b) exposing the apparatus to the wind.

4. A wind generator turbine apparatus comprising:
   (a) a base for supporting the apparatus;
   (b) a base mount mounted on the base;
   (c) a permanent magnet generator (PMG) seated on the base mount, the permanent magnet generator comprising a vertically aligned shaft extending along a vertical axis defined by the shaft and adapted to generate electricity when caused to spin circularly;
   (d) a wind turbine comprising:
      i. a housing mounted over and around the shaft of the PMG;
      ii. a plurality of blades circumferentially arranged about the vertical axis of the shaft of the housing, each blade is comprised of: (1) an upper isolator pad; (2) a lower isolator pad; and (3) a blade surface disposed between the upper and lower pad and adapted for receiving force created by wind to cause the blades to spin about the vertical axis of the shaft;
      iii. an upper linkage member mounted to: (i) each of the blades through each of the upper isolator pads; and (ii) a first end of the PMG housing;
      iv. a lower linkage member mounted to: (i) each of the blades through each of the lower isolator pads; and (ii) a lower end of the housing;
      v. an upper linkage cap mounted on the upper linkage member and the upper end of the PMG housing and connected to the shaft wherein the shaft is caused to spin about the vertical axis when wind force is applied to the blades to generate electricity.

* * * * *